(12) United States Patent
Schuster et al.

(10) Patent No.: US 6,584,490 B1
(45) Date of Patent: Jun. 24, 2003

(54) SYSTEM AND METHOD FOR PROVIDING CALL-HANDLING SERVICES ON A DATA NETWORK TELEPHONE SYSTEM

(75) Inventors: Guido M. Schuster, Des Plaines, IL (US); Ikhlaq S. Sidhu, Vernon Hills, IL (US); Jerry J. Mahler, Prospect Heights, IL (US); Frederick D. Dean, Chicago, IL (US); Jacek A. Grabiec, Chicago, IL (US); Ismail Dalgic, Mountain View, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/470,879

(22) Filed: Dec. 22, 1999

Related U.S. Application Data

(63) Continuation-in-part of application No. 09/451,388, filed on Nov. 30, 1999, now Pat. No. 6,446,127, which is a continuation-in-part of application No. 09/181,431, filed on Oct. 30, 1998, now Pat. No. 6,161,134.

(51) Int. Cl.[7] .............................................. G06F 13/00
(52) U.S. Cl. ....................................................... 709/200
(58) Field of Search ................................ 709/200, 205, 709/212, 217, 218, 219, 220, 222, 223, 227, 228; 455/403, 899; 379/219, 220.01

(56) References Cited

U.S. PATENT DOCUMENTS

| 4,953,198 A | 8/1990 | Daly et al. ................. 379/61 |
| 5,428,663 A | 6/1995 | Grimes et al. |
| 5,448,623 A | 9/1995 | Wiedeman et al. |
| 5,497,339 A | 3/1996 | Bernard .................. 364/705.05 |
| 5,557,658 A | 9/1996 | Gregorek et al. ............. 379/67 |
| 5,606,594 A | 2/1997 | Register et al. ............... 379/58 |
| 5,727,057 A | 3/1998 | Emery et al. ................ 379/211 |
| 5,732,074 A | 3/1998 | Spaur et al. |
| 5,732,216 A | 3/1998 | Logan et al. |
| 5,742,905 A | 4/1998 | Pepe et al. .................. 455/461 |

(List continued on next page.)

FOREIGN PATENT DOCUMENTS

| DE | 198 13 179 A 1 | 9/1999 |
| EP | 0 578 374 A1 | 6/1993 |
| EP | 0 704 788 A2 | 4/1996 |
| EP | 0 858 202 A2 | 2/1998 |
| EP | 0 869 688 A2 | 10/1998 |

(List continued on next page.)

OTHER PUBLICATIONS

Hansson, Allan et al., Phone Doubler—A Step Towards Integrated Internet and Telephone Communities, Ericsson Review, No. 4, 1997, pp. 142–152.

(List continued on next page.)

*Primary Examiner*—Robert B. Harrell
(74) *Attorney, Agent, or Firm*—McDonnell Boehnen Hulbert & Berghoff

(57) ABSTRACT

A system and method for providing call handling services on a data network telephony system. A portable information device, such as a PDA, associated with a user contains the user's address and/or appointment book information. The address and/or appointment book information includes priority information comprising one or more address/appointment entries having associated priority levels. The priority information is transmitted from the portable information device across a link to a data network telephone or other voice communication device, where it is stored in a call handling database. When an incoming call request is received at the data network telephone, the call is handled according to the priority information contained in the call handling database.

41 Claims, 15 Drawing Sheets

U.S. PATENT DOCUMENTS

| | | | |
|---|---|---|---|
| 5,838,665 A | 11/1998 | Kahn et al. | 370/260 |
| 5,850,433 A | 12/1998 | Rondeau | 379/201 |
| 5,875,405 A | 2/1999 | Honda | |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | 455/414 |
| 5,933,778 A | 8/1999 | Buhrmann et al. | 455/461 |
| 5,960,340 A | 9/1999 | Fuentes | |
| 5,991,394 A | 11/1999 | Dezonno et al. | |
| 6,020,916 A | 2/2000 | Gerszberg et al. | |
| 6,031,904 A | 2/2000 | An et al. | |
| 6,044,403 A | 3/2000 | Gerszberg et al. | |
| 6,075,992 A | 6/2000 | Moon et al. | |
| 6,161,134 A | 12/2000 | Wang et al. | |
| 6,163,598 A | 12/2000 | Moore | |
| 6,266,539 B1 | 7/2001 | Pardo | |
| 6,301,609 B1 | 10/2001 | Aravamudan et al. | |
| 6,308,201 B1 | 10/2001 | Pivowar et al. | |
| 6,400,804 B1 | 6/2002 | Bilder | |

FOREIGN PATENT DOCUMENTS

| | | |
|---|---|---|
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

Zellweger, Polle T. et al. *An Overview of the Etherphone System and Its Applications*, Xerox Palo Alto Research Center (Mar. 1988), pp. 160–168, XP 000617541.

Terry, Douglas B. et al. *Managing Stored Voice In the Etherphone System*, Xerox Palo Alto Research Center vol. 1, (Feb. 1998), pp. 3–27, XP 000032477.

Terry, Douglas B. et al. *Managing Stored Voice In the Etherphone System*, Operating Systems Review (SIGOPS), US, ACM Head Quarter, New York, NY. vol. 21, No. % (Nov. 8, 1987), pp. 103–104, XP000005196.

U.S. patent application Ser. No. 09/451,388, Schuster et al., filed Nov. 30, 1999.

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 9, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/406,152, Schuster et al., filed Sep. 27, 1999.

U.S. patent application Ser. No. 09/405,981, Schuster et al., filed Sep. 27, 1999.

U.S. patent application Ser. No. 09/406,128, Schuster et al., filed Sep. 27, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.s. patent application Ser. No. 09/516,269, Schuster et al., filed Feb. 29, 2000.

U.S. patent application Ser. No. 09/515,366, Schuster et al., filed Feb. 29, 2000.

U.S. patent application Ser. No. 09/707,708, Schuster et al., filed Nov. 7, 2000.

U.S. patent application Ser. No. 09/677,077, Schuster et al., filed Sep. 29, 2000.

U.S. patent application Ser. No. 09/584,927, Schuster et al., filed May 31, 2000.

U.S. patent application Ser. No. 09/726,993, Schuster et al., filed Nov. 30, 2000.

U.S. patent application Ser. No. 09/728,833, Schuster et al., filed Nov. 30, 2000.

International Search Report for PCT Application Ser. No. PCT/US00/26618, Dated Feb. 19, 2001.

Pepper, David J. et a., The Call Manager System: A Platform for Intelligent Telecommunications Services, Speech Communication, vol. 23, (1997), pp. 129–139.

Dalgic, Ismail et al., True Number Portability and Advanced Call Screening in a SIP–Based IP Telephony System, IEEE Communications Magazine, vol. 37, No. 7, (Jul. 1999), pp. 96–101.

International Search Report for PCT Application Ser. No. PCT/US00/26094, Dated Jan. 31, 2001.

International Search Report for PCT Application Ser. No. PCT/US00/26594, Dated Feb. 6, 2001.

Watanabe, H. et al., Development of the BTRON–BrainPad, Proceedings 13th Tron Project International Symposium, Online!, (Dec. 4–7, 1996), pp. 95–103.

Gessler, Stefan et al., PDAs as Mobile WWW Browsers, Computer Networks and ISDN Systems, vol. 28, No. 1, (Dec. 1995), pp. 53–59.

International Search Report for PCT Application Ser. No. PCT/US00/26650, Dated Feb. 19, 2001.

International Search Report for PCT Application Ser. No. PCT/US00/41020, Dated Feb. 21, 2001.

Anquetil, L.P. et al., Media Gateway Control Protocol and Voice Over IP Gateways. MGCP and VoIP Gateways Will Offer Seamless Interworking of New VoIP Networks with Today's Telephone Networks, Electrical Communication, (Apr. 1, 1999), pp. 151–157.

International Search Report for PCT Application Ser. No. PCT/US00/26649, Dated Feb. 6, 2001.

3COM SIP Solutions 1.0 benefits brochure. (4 total pages) No date.

Sidhu, Ikhlaq and Bezaitis, Andrew, Eat or be eaten, www.americansnetwork.com/issues/99issues/991101/991191_eat.htm. printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schultzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

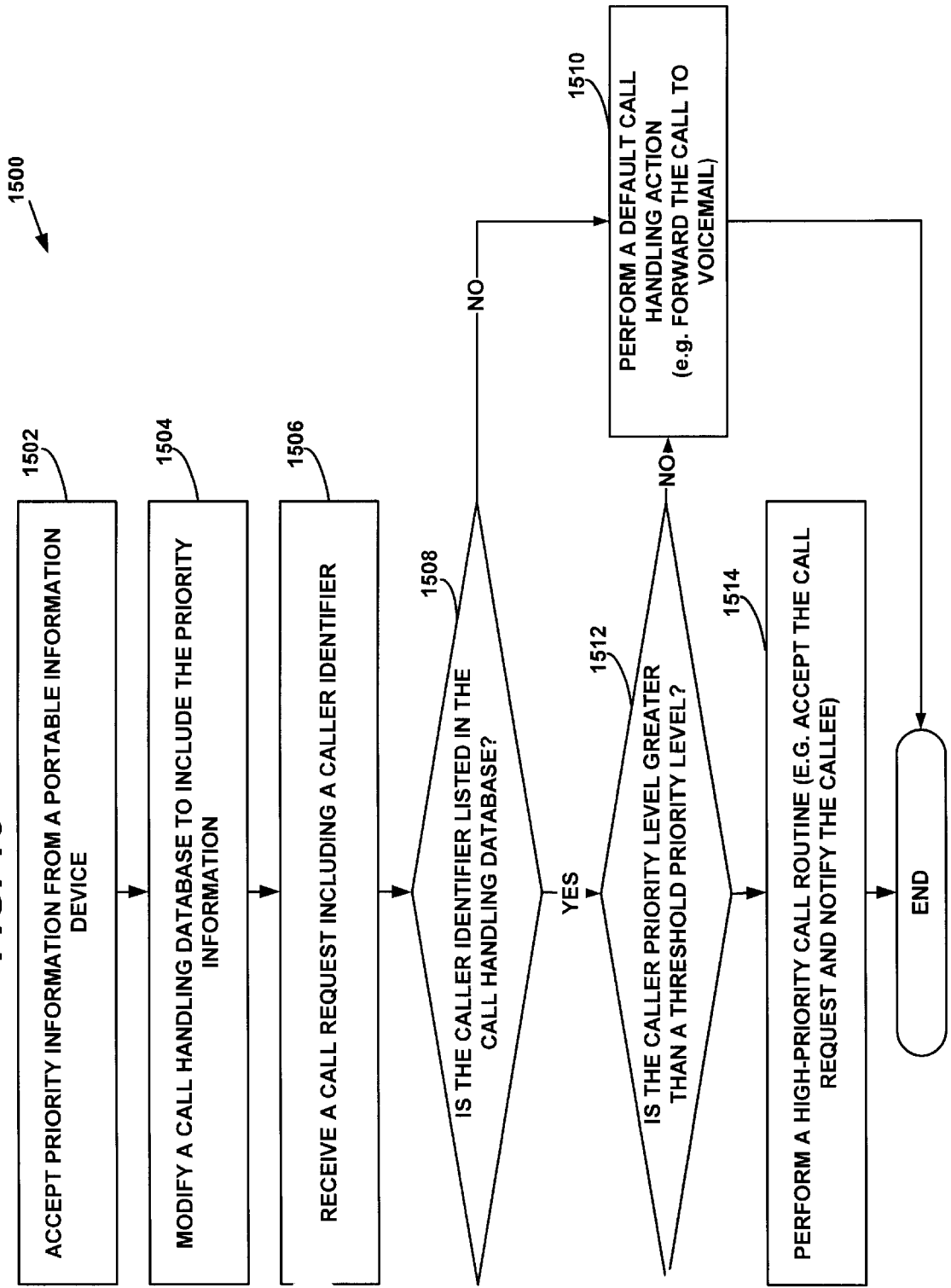

SYSTEM AND METHOD FOR PROVIDING CALL-HANDLING SERVICES ON A DATA NETWORK TELEPHONE SYSTEM

PRIORITY

This application is a Continuation-In-Part of U.S. patent application Ser. No. 09/181,431, filed Oct. 30, 1998 now U.S. Pat. No. 6,161,134, by inventors Peter Si-Sheng Wang and Ismail Dalgic, titled "Method, Apparatus and Communications System for Companion Information and Network Appliances," assigned to 3Com Corporation. This application is also a Continuation-In-Part of U.S. patent application Ser. No. 09/451,388, now U.S. Pat. No. 6,446,127, filed Nov. 30, 1999 by Guido Schuster et al. and titled "System And Method For Providing User Mobility Services On A Telephony Network", also assigned to 3Com Corporation.

BACKGROUND OF THE INVENTION

1. Field of the Invention

The present invention is related to a method and system for call handling services on a network. In particular, the present invention relates to a method and system for providing call handling services that can be configured by a user-operated portable information device.

2. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound, converting the sound from the handset to analog signals, generating the appropriate dial tones when a key on the keypad is pressed, and ringing when there is an incoming call.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. A PSTN telephone having a display function is effectively limited to displaying text, again, as a "dumb" terminal.

The Internet presents a possible solution for distributing intelligence to telephony terminal devices. In Internet telephony, digitized voice is treated as data and transmitted across a digital data network between a telephone call's participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

It would be desirable to incorporate CLASS and PBX features into a data network telephony system that uses a data network such as the Internet.

It would be desirable to provide new features and enhancements to telephony service that accommodate and conform to users' needs.

It would also be desirable to provide features and capabilities to telephone service that create new opportunities for users and for service providers.

It would also be advantageous to allow a user to utilize information stored in a user's Portable Information Device (PID), e.g. a Personal Digital Assistant (PDA), to assist in providing call handling services and to control a telephone to suit the user's needs.

It would also be desirable to use a telephone to enable the PID as a personal communication tool for mobility and call handling services and for control of a telephone.

SUMMARY OF THE INVENTION

These and other features and advantages of the present invention will become more apparent from the following detailed description of preferred embodiments of the present invention.

One embodiment of the invention is directed to a system for providing call handling services in a data network telephone system. The system includes a data network to provide data connectivity for a plurality of data communications channels using data transport protocols. A data network telephone is connected to the data network. The data network telephone is operable to communicate a voice signal as voice-over-data packets on a voice-over-data channel. The voice-over-data channel is one of the plurality of data communications channels on the data network. The data network telephones are each operable to convert voice-over-data packets communicated on the voice-over-data channel to voice signals. Also included is a portable information device having a data network telephone interface. The portable information device is operable to transmit priority information to the data network telephone via the data network telephone interface. The data network telephone receives the priority information and accesses the priority information in response to the data network telephone receiving a call request across the data network.

A voice communication device for call handling, such as a data network telephone, is also provided. The voice communication device includes an interface to a data network, a plurality of telephony functions operable to communicate a voice signal as voice-over-data packets on a voice-over-data channel, the voice-over-data channel being one of a plurality of data communications channels supported by the data network. The telephony functions are operable to convert voice-over-data packets communicated on the voice-over-data channel to voice signals. The voice communication device also includes a PID interface link to a portable information device to transfer data between the portable information device and the voice communication device. A call handling application is operable to accept priority information across the PID interface link from the portable information device. In response to the data network telephone receiving a call request across the data network, the call handling application accesses the priority information to determine a call handling operation.

A method for providing call handling services at a data network telephone in a data network telephone system is also provided. The method includes accepting priority information from a portable information device, modifying a call handling database to include the priority information, and accessing the call handling database responsive to the data network telephone receiving a call request.

The method may further include determining whether the call handling database contains the caller identifier of the party making the call request. If the call handling database contains the user information, then a determination is made as to whether the caller priority level is greater than a threshold priority level. If the caller priority level is greater than the threshold priority level, then the data network telephone performs a high-priority call routine.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 15 is a flow diagram illustrating a method for providing call-handling services on a data network telephone system according to an alternative embodiment of the present invention.

DETAILED DESCRIPTION OF THE PREFERRED EMBODIMENT

The following references to related patent applications are incorporated by reference herein:

"System and Method for Providing User Mobility Services on a Telephony Network" to Schuster, et al., Ser. No. 09,451,388

"Method Apparatus and Communication System for Companion Information and Network appliances" to Wang, et al., Ser. No. 09/181,431.

"System and Method for Enabling a Personal Information Device for Use in a Data Network Telephone System" to Schuster, et al.

"System and Method for Controlling Telephone Service Using a Wireless Personal Information Device" to Schuster, et al., Ser. No. 09/406,321.

"System and Method for Advertising Using Data Network Telephone Connections" to Schuster, et al., Ser. No. 09/406,320.

"System and Method for Providing User-Configured Telephone Service in a Data Network Telephony System" to Sidhu, et al., Ser. No. 09/405,283.

"System and Method for Accessing a Network Server Using a Portable Information Device Through a Network Based Telecommunication System" to Schuster, et al., Ser. No. 09/406,322.

"System and Method for Interconnecting Portable Information Devices Through a Network Based Telecommunication System" to Schuster, et al., Ser. No. 09/406,152.

"System and Method for Enabling Encryption on a Telephony Network" to Schuster, et al., Ser. No. 09/405,981.

"System and Method for Associating Notes with a Portable Information Device on a Network Telephony Call" to Schuster, et al., Ser. No. 09/406,151.

"System and Method for Providing Shared Workspace Services Over a Telephony Network" to Schuster, et al., Ser. No. 09/406,298.

"System and Method for Providing Service Provider Configurations for Telephones in a Data Network Telephony System" to Schuster, et al., Ser. No. 09/406,066.

System and Method for Using a Portable Information Device to Establish a Conference Call on a Telephone Network" to Schuster, et al., Ser. No. 09/406,128.

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313.

Dalgic, et al., "True Number Portability and Advanced Call Screening in a SIP-Based IP Telephony System," *IEEE Communications Magazine*, July, 1999, pp. 96–101.

A. PID-Enabled Data Network Telephony System

Figure 1:
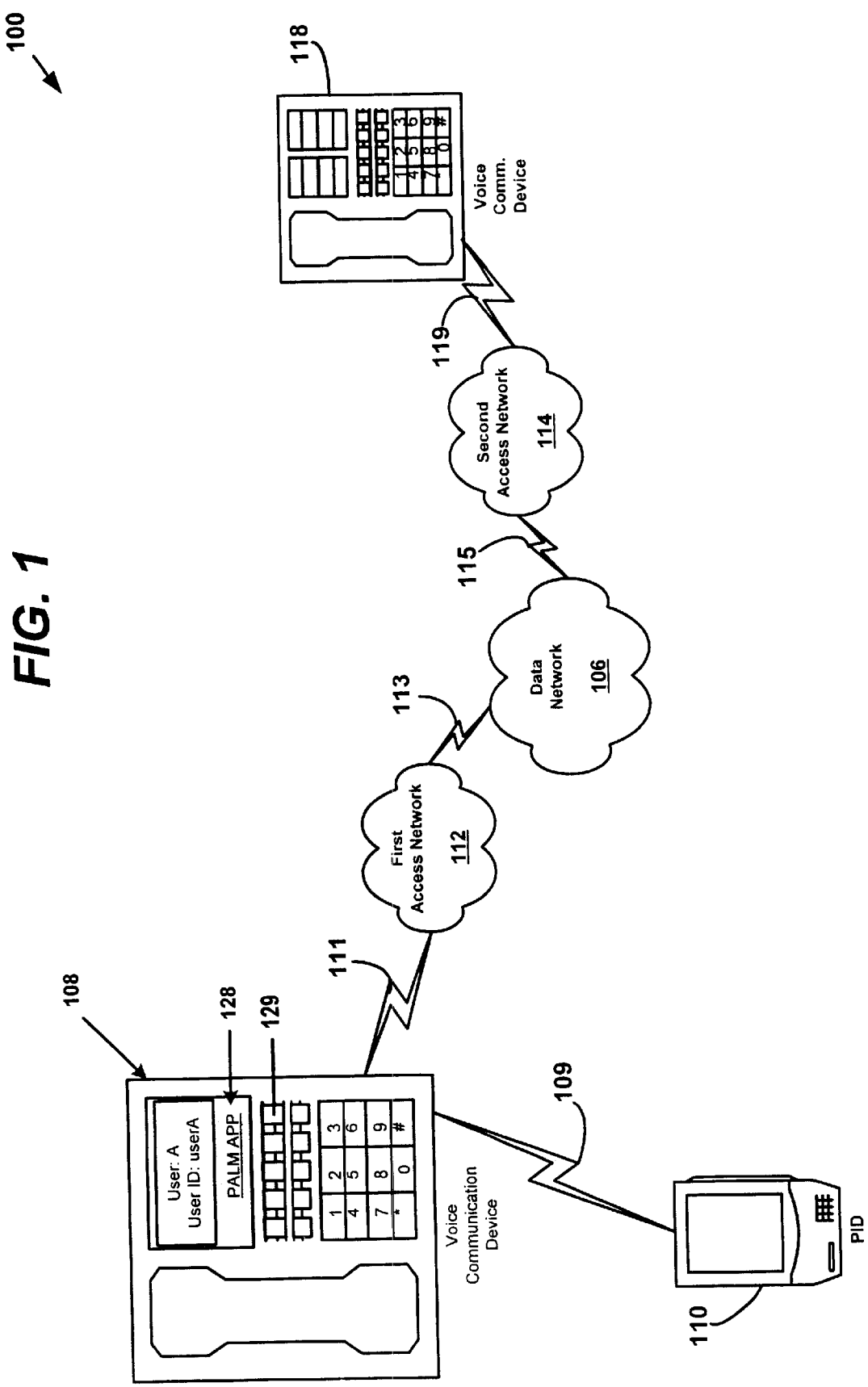
FIG. 1 is block diagram of a data network telephony system according to one embodiment of the present invention.

FIG. 1 is a block diagram showing an exemplary embodiment of a system 100 for providing user mobility services on a telephony network according to the present invention. The system includes a data network 106. A first voice communication device 108 linked to a first access network 112 via connection 111 may communicate over the data network 106 by connecting via the first access network 112. A second voice communication device 118 is linked to a second access network 114 through connection 119 and may communicate over the data network 106 by connecting via the second access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice-Over-Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office. Other data besides voice data may also be communicated over the data network 106.

The voice communication devices 108 and 118 typically include a voice input, a voice output, and a voice processing system and may be data network telephones (described further below with reference to FIG. 6). The voice processing system converts voice sound to digital data signals that are communicated on a voice connection over the data network. The voice processing system also converts digital data signals received from the voice connection to voice sound. The voice communication devices 108 and 118 typically include a central processing unit and memory to store and process computer programs. Additionally, each voice communication device typically includes a unique network address, such as an IP address, in memory to uniquely identify it to the data network 106 and to permit data packets to be routed to the device.

A PID 110 is shown linked to the first voice communication device 108 via link 109, and may enable communications over the data network 106 via the first access network 112. The PID 110 includes user attributes stored in a user information database. The user attributes may contain such information as a user identifier, schedule information, information about contacts, and other information that is associated with a user of the PID 110. The PID 110 preferably includes a user interface allowing a user to easily enter and retrieve data. In a preferred embodiment, the user interface includes a pressure-sensitive display that allows a user to enter input with a stylus or other device. An example of a PID with such an interface is a PDA (Personal Digital Assistant), such as one of the Palm™ series of PDAs offered by 3Com® Corporation. Alternatively, the PID 110 may be a form of smart card, in which the user attributes are programmed into the card with the assistance of a programming device. In such a case, the user attributes might not be easily modified by the user when the user is not in the presence of the programming device. The PID 110 may include other functionality, such as wireless phone, two-way radio, digital camera, hand-held computer game, or digital audio recording functionality, for example. In one embodiment, the PID 110 is a personal computer (PC) and associated applications, which need not be easily moved from one location to another.

Link 109 is a point-to-point link, and may be entirely or partially wireless, or may be a hard-wired connection. Preferably, the link 109 is a wireless link, such as an infrared link specified by the Infrared Data Association (IrDA) (see irda.org for further information) or a radio frequency (RF) link such as the Bluetooth system (see www.bluetooth.com for further information). However, the point-to-point link can also be a hardwired connection, such as an RS-232 or Universal Serial Bus (USB) serial port connection. An example of a serial port connection is a docking cradle or a synchronizing cable connection. In one embodiment, the link may simply be a connection between two subcomponents within the same device. An example would be a network-connected PC having data network telephone functionality, in which the PC would function as the PID 110 and as the data network telephone 108.

In one embodiment, the voice communication devices 108 and 118 each include a handset with a receiver and transmitter similar or identical to handsets of traditional circuit-switched telephones. A console on which the handset sits may include the voice processing system, a display, and a keypad, for example.

In a preferred embodiment, a portion of each of the voice communication devices 108 and 118 utilizes an NBX 100™ communication system phone offered by 3Com® Corporation. In alternative embodiments, the voice communication devices 108 and 118 may include any device having voice communications capabilities. For example, a personal computer having a microphone input and speaker output may also be used to implement the voice communication devices 108 and 118. Other configurations are also intended to be within the scope of the present invention.

The details relating to operation of the voice communication devices 108 and 118 depend on the nature of the data network 106 and the nature of the access networks 112 and 114 connecting the voice communication devices 108 and 118 to each other and/or to other network entities. The nature of applications used on the voice communication devices 108 and 118 will also influence the architecture of and features included in the voice communication devices 108 and 118. For example, if a videophone application is to be fully utilized on the voice communication drive 108, then a display screen of some type (e.g., LCD or TFT) should be included in the voice communication device 108 itself or as a connected peripheral device.

The access networks 112 and 114 typically include any high bandwidth network adapted for data communications, i.e. a network having greater than 64,000 bits-per-second (bps) bandwidth. The access networks 112 and 114 may link to the voice communication devices 108 and 118 using an Ethernet LAN, a token ring LAN, a coaxial cable link (e.g. CATV adapted for digital communication), a digital subscriber line (DSL), twisted pair cable, fiberoptic cable, an Asynchronous Transfer Mode (ATM) link, an integrated services digital network (ISDN) link, and wireless links, for example. In embodiments that may not require bandwidth greater than 64,000 bps, the access networks 112 and 114 may also include the PSTN and link the voice communications devices 108 and 118 by an analog modem. Further details regarding specific implementations are described below, with reference to FIGS. 2 through 13.

B. System for Providing User Mobility and Call Handling Services on a Data Network Telephony System One advantage of the network telephony system 100 is that it may be used to provide user mobility services to users of the network telephony system. For example, the PID 110 may contain a profile of the user and one or more applications that control the voice communication device 108. By downloading the profile and any communications settings for the user, the user may configure any voice communication device 108 to take calls directed at the user's user identifier. The PID 110 allows the user to be reachable by telephone as long as the user is near a telephone such as the voice communication device 108 with the PID link 109. Of course, the user will preferably also be able to make calls from the voice communication device 108.

The applications on the PID 110 that control the telephone may be advantageously used to initiate calls from the PID 110. For example, the PID 110 may include an address book configured to send a request to initiate a call to a callee having an entry in the user's PID address book by selecting the entry and downloading the request over the PID link 109. The address book application may be enhanced to include a screening profile that allows a user to indicate a priority level for calls that the user may receive from callers identified in the user's address book. For example, the user may be in a business meeting in a room having a telephone such as the voice communication device 108. The user may configure the voice communication device 108 to receive calls to his user identifier as indicated in his PID 110. The user may also screen calls by setting a priority level for individuals identified in the address book in the user's PID 110. A selected low priority level would block calls from certain individuals, while calls from other individuals may be deemed important enough to set to a high enough priority level to interrupt the business meeting. Furthermore, a scheduling application may be included to keep track of appointments. Priority levels may also be assigned to appointments to assist in call handling.

Another advantage of the system 100 is that the voice communication device 108 may be operable to download a telephone control application and an address book having the capabilities discussed above to the PID 110 over the PID link 109. The voice communication device 108 may include a button, either on the display screen, or on the keypad, that when pressed, will perform the download.

In one embodiment, the PID 110 allows a user to select the communications partner or partners to be included in the call. The PID 110 then transfers information about the communication partner(s) to the first voice communication device 108 through the link 109. The first voice communication device 108 then sets up the call (using a call setup procedure) with voice communication device(s) associated with the communication partner(s) selected by the PID user associated with the first voice communication device 108.

Once a call is set up, data can be transferred between the voice communication devices. PIDs, such as the PID 110, associated with the parties to the call may also be used to communicate information. For example, the PID 110 linked to the first voice communication device 108 may be able to accept and display PID data entered by a user through a user interface on the PID 110. The PID data can then be communicated across the link 109 to the voice communication device 108 for transport across the first access network 112, the data network 106, and the second access network 114 to the second voice communication device 118 (and alternatively to a PID linked to the voice communication device 118). The PID 110 can also receive PID data and other data across the link 109 for display on the PID 110. A voice-over-data channel for communicating voice-over-data can concurrently exist with this communication of PID data over a PID data channel. Preferably, all parties to the call have PIDs that may be linked to the voice communication devices associated with the parties. In this way, a user of the PID 110 can communicate PID data to other parties to the call while voice signals are communicated between the voice communication devices.

1. Providing User Mobility Services on a Local Area Network

Figure 2:
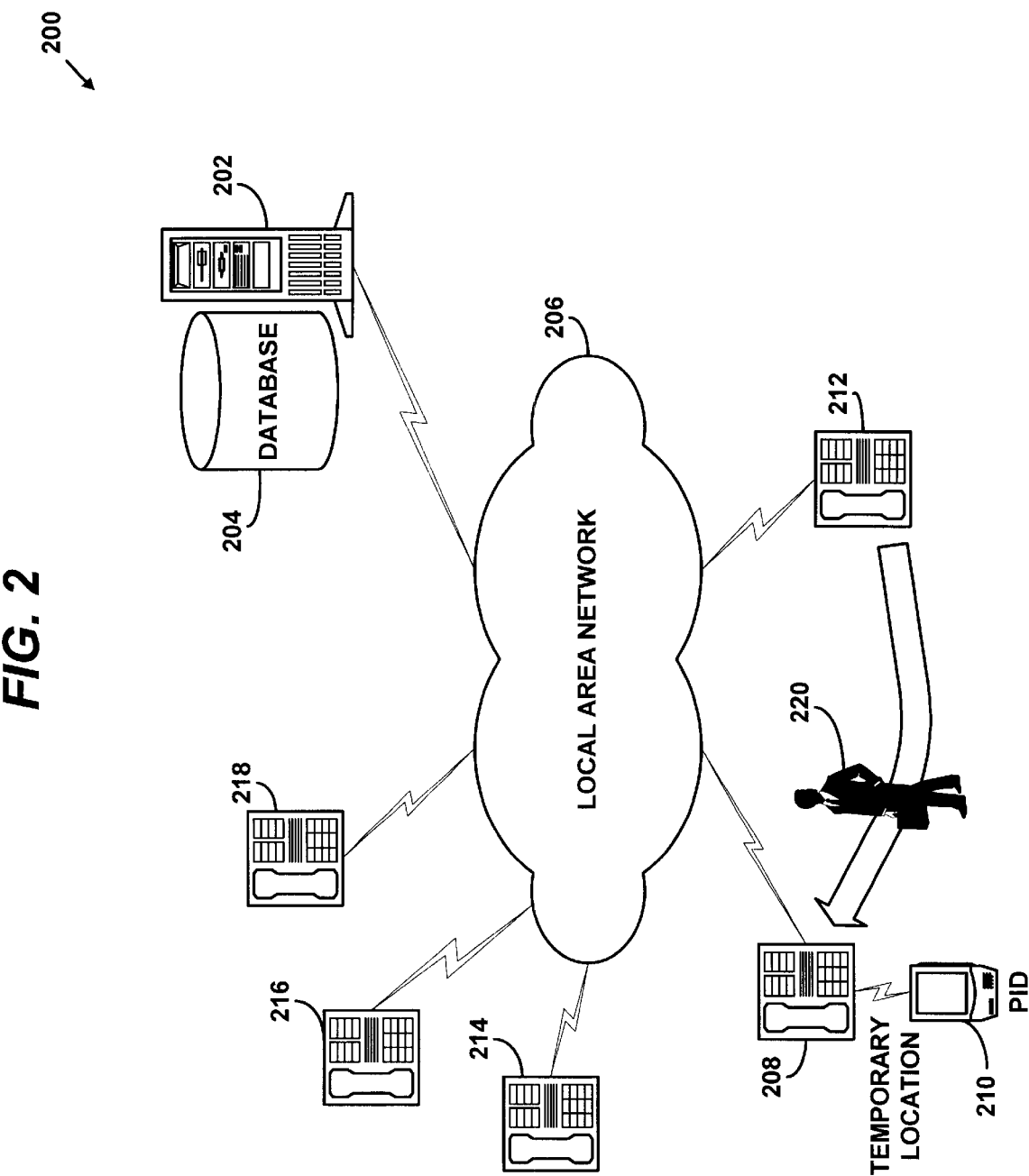
FIG. 2 is a block diagram showing a system for providing user mobility and call handlingservices on a telephony network according to an exemplary embodiment of the present invention.

FIG. 2 is a block diagram showing a system 200 for providing user mobility and call handling services on a LAN according to one embodiment of the present invention. System 200 includes a registration server 202 having access to a registration database 204. The registration server 202 is linked to a packet-switched local area network (LAN) 206. A voice communication device 208 is also a part of the network 206. Also shown are additional voice communication devices 212, 214, 216, and 218, which may or may not be identical to each other and voice communication device 208. The voice communication devices 208, 212, 214, 216, and 218 are each preferably able to accept information from a PID 210. A user 220 is shown as having recently moved from the voice communication device 212 to the voice communication device 208. The PDA 210 is associated with the user 220. The connections shown in FIG. 2 may be entirely or partially wireless, or they may be hard-wired connections. The LAN 206, the voice communication device 208, and the PID 210 correspond respectively to the first access network 112, the voice communication device 108, and the PID 110 shown in FIG. 1.

The LAN 206 is preferably an Ethernet LAN operating according to the IEEE 802.3 specification, which is incorporated by reference herein. The voice communication devices 208, 212, 214, 216, and 218 are preferably modified Ethernet phones. An Ethernet phone is a telephone capable of communicating through an Ethernet port.

In most cases, Ethernet phones support Internet Protocol (IP), using an IP address that is either statically configured or obtained via Dynamic Host Configuration Protocol (DHCP). An exemplary Ethernet phone, such as voice communication device 208, contains two basic parts: the signaling-stack and the media-engine. While currently two different standards (SIP and H.323) and several proprietary approaches exist for the signaling stack, the media is preferably transported via the Real Time Protocol (RTP), which itself is carried inside of User Datagram Protocol (UDP). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

The purpose of the signaling stack in an exemplary Ethernet phone, such as the voice communication device 208, is to set up, manage, and tear down a call. During the setup phase, the location of the endpoint is discovered, communication parameters, such as the supported voice CODEC types are determined, the voice channel is established, and other parties are invited to the call if needed. During the management phase, for example, other parties are invited to the call or the existing CODEC can be changed. During the teardown phase, the call is terminated. The preferred call-management protocol for the present invention is Session Initiation Protocol (SIP), which is described in M. Handley et al., "SIP: Session Initiation Protocol," IETF RFC 2543, March 1999, incorporated by reference herein. Alternative call-management protocols, such as the ITU-T H.323 protocol and others, may also be used to implement the present invention.

The purpose of a media engine in an exemplary Ethernet phone is to sample the voice, encode the samples, and build the RTP packets on the sending side. On the receiver side, in addition to performing the reverse operations, the media engine also typically manages a receiver buffer to compensate for network jitter. The media engine includes the features discussed with reference to the user interface of the voice communication device 108.

The user 220 is shown as being recently relocated from voice communication device 212 to voice communication device 208. In the example illustrated by FIG. 2, voice communication device 212 may be in the user's office and voice communication device 208 may in be a conference room, for example. Prior to leaving the office, the user 220 may have been registered (associated) with the voice communication device 212 in the office, so that calls were routed to that location or were processed according to attributes associated with the user being located in the office. When the user moves to the voice communication device 208 in the conference room, it would be desirable for the user to be registered with the voice communication device 208 instead of the voice communication device 212.

According to one embodiment of the present invention, the user 220 is able to register with the voice communication device 208 by using a portable information device 210 to transmit user attributes to the voice communication device 208, which may then transmit all or some of the user attributes to the registration server 202, so that the registration database 204 may be updated with the revised user communication-location information. If the PID 210 is a PDA, the process may be initiated by synchronizing the PDA 210 with an Ethernet telephone, for example.

In another embodiment, the user 220 may use the PID 210 to configure the voice communication device 208 to screen calls based on priority levels set for individuals for whom the user 220 has provided an entry in an address book. Schedule information may also serve as a basis for screening calls, in which case each schedule event is assigned a priority level by the user. The priority level system used in a scheduling application is preferably configured to have the same priority scale (e.g., 1 to 10) as the priority level system used in an address book application. The user 220 may configure the voice communication device 208 for call screening by communicating over the PID link (such as the link 109 in FIG. 1).

In still another embodiment, the user 220 may have a PID 210 that does not include the applications needed to perform the configuration of the voice communication device 208, such as a telephone controller and a telephony enhanced address book/scheduling application. The user 220 may configure the PID 210 to include these applications by using a PID configuration function (described below with reference to FIG. 6) on the user's voice communication device 212.

Figure 3:
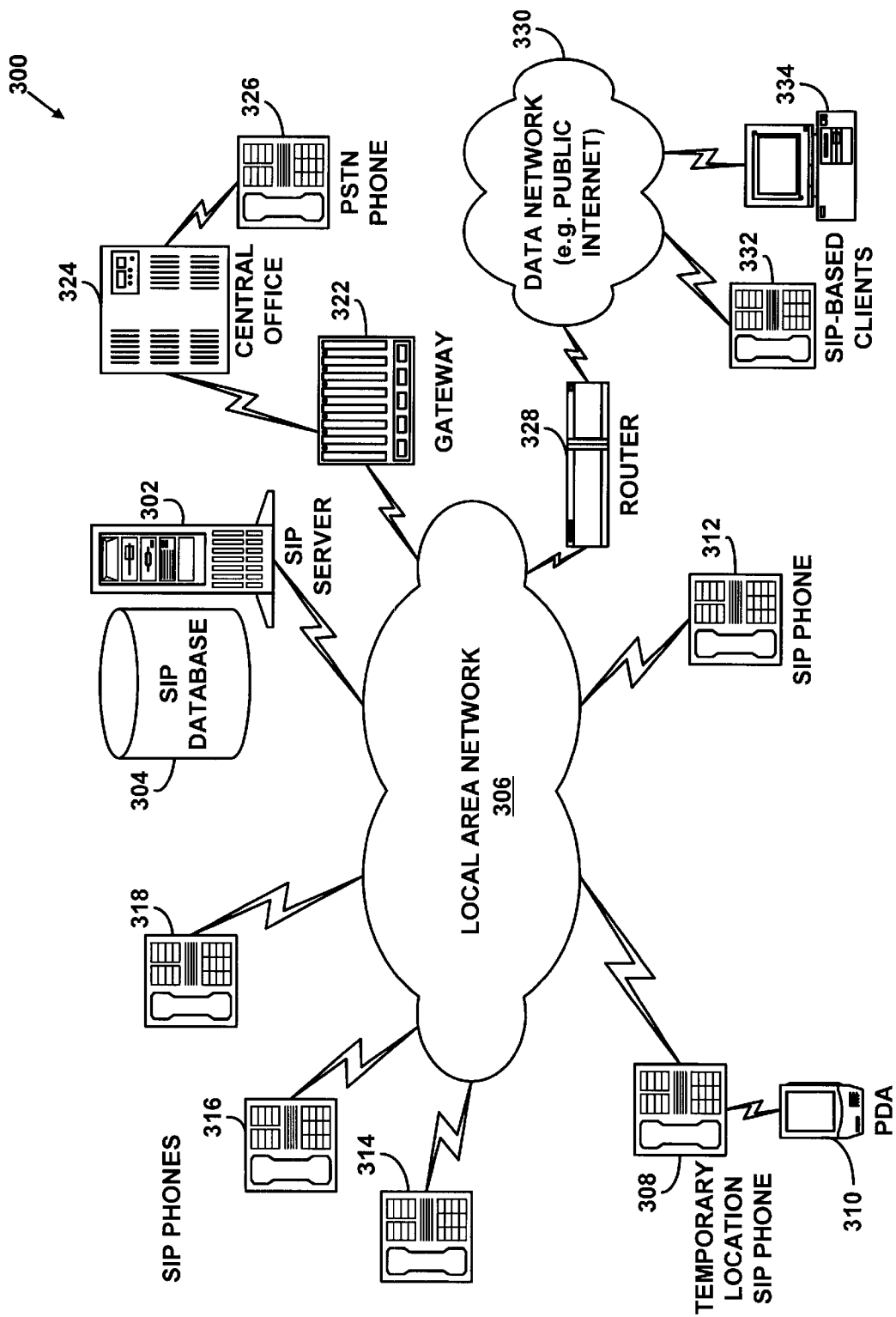
FIG. 3 is a block diagram showing a system for providing user mobility and call handling services on a telephony network according to a preferred embodiment of the present invention.

2. Providing User Mobility and Call Handling Services on a LAN using the Session Initiation Protocol FIG. 3 is a block diagram showing an exemplary user mobility and call handling system 300 according to a preferred embodiment of the present invention, in which SIP is used as the call-management protocol. (In an alternative embodiment, call-handling services are provided without user mobility services, as may be the case when the PID is a PC and associated applications.) Portions of the system 300 are similar to the system 200 illustrated in FIG. 2. The system 300 includes a SIP server 302 having access to a SIP database 304. The SIP server is shown with a link to a LAN 306, which is preferably an Ethernet LAN. SIP phones 308, 312, 314, 316, and 318 are Ethernet phones, and are also linked to the LAN 306. A PDA 310 serves as a PID for customizing the communication system 300 according to a preferred embodiment of the present invention. Such customizing could include using address book or schedule information to assist in call handling. The number of SIP phones in the system 300 can vary to meet the needs of the users of the system 300.

Also shown in the LAN 306 is a gateway 322 with a SIP client. The gateway 322 is preferably a VoIP gateway and is in communication with a PSTN central office 324, which provides PSTN service to a PSTN phone 326. The PSTN phone 326 is likely to be one of many PSTN phones serviced by the central office 324. Additional portions of a PSTN network have been omitted from FIG. 3 to improve clarity. The PSTN network is well known by those having skill in the art of telecommunications. The gateway 322, the central office 324, and the PSTN 326 are optional and need not be included within the system 300.

A router 328 may also be connected to the LAN 306. The router 328 connects the LAN 306 to a data network 330, such as a public internet. The data network preferably includes connections to additional SIP-based clients, such as additional SIP phone 332 and a personal computer 334 operating as a SIP client. SIP will be described in more detail with reference to FIGS. 4, 5, 10, and 11. The router 328, the data network 330, and the SIP-based clients 332 and 334 are optional and need not be included within the system 300.

3. Local Area Network as an Exemplary Access Network

Figure 4:
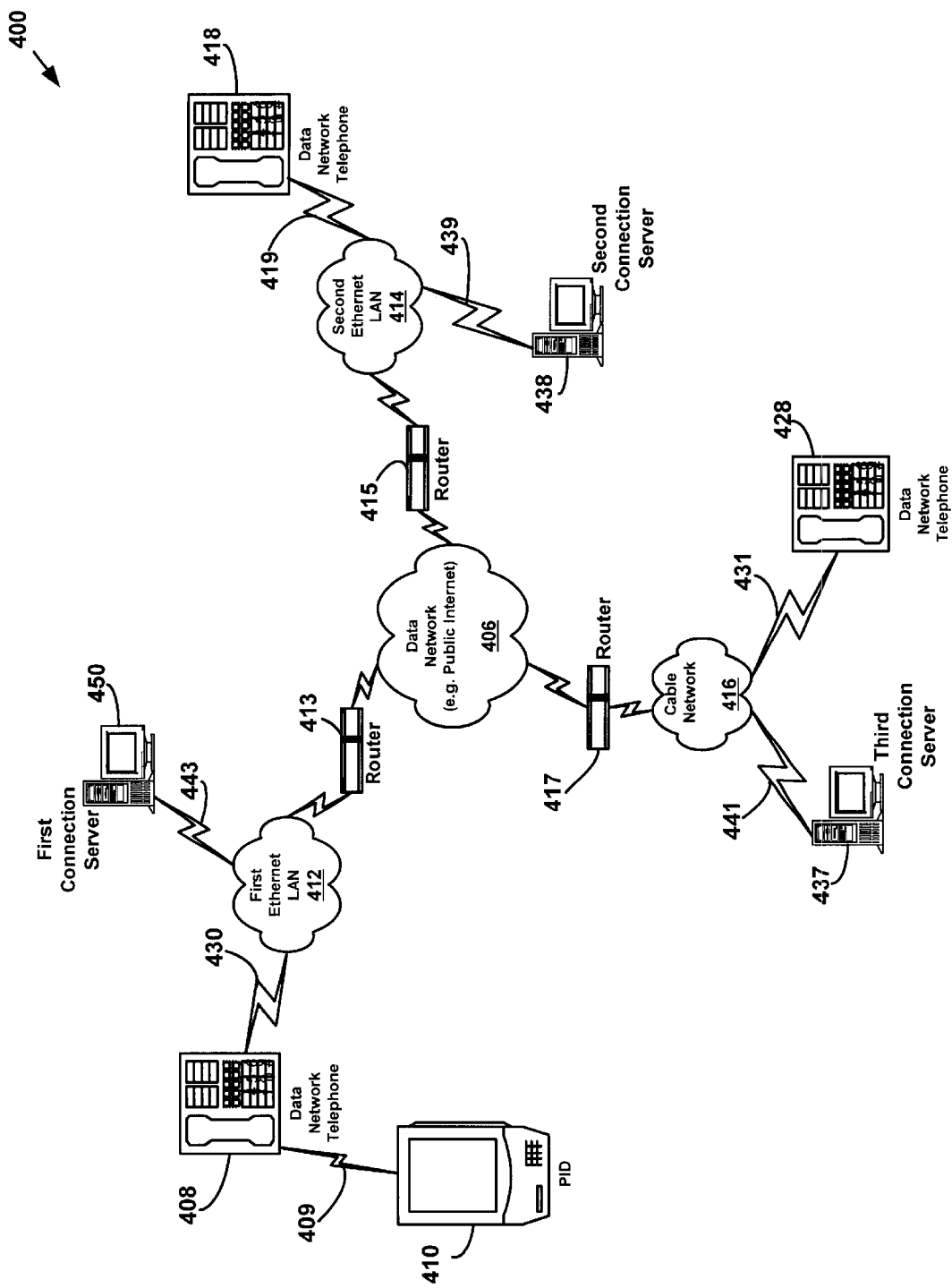
FIG. 4 is a block diagram showing a system for providing user mobility and call handling services on a telephony network according to an exemplary embodiment of the present invention.

FIG. 4 is a block diagram showing an example of the system 100 of FIG. 1 for providing call handling services according to the present invention. The system 400 in FIG. 4 includes a local area network 412 connected to a data network 406 by a first router 413. A second local area network 414 is connected to the data network 406 by a second router 415. A cable network 416 is connected to the data network 406 by a third router 417. Those of ordinary skill in the art will appreciate that while FIG. 4 illustrates the access networks as two local area networks 412 and 414, and a cable network 416, other types of networks may be used. For example, the local area networks and the cable network may be replaced by ISDN, DSL, or any other high-speed data link.

The local area networks 412 and 414 provide data connectivity to their respective network elements. For example, the first LAN 412 provides data connectivity to at least a first data network telephone 408 and a first network telephony connection server 450. The second LAN 414 provides data connectivity to at least a second data network telephone 418 and a second network telephony connection server 438. The local area networks 412 and 414 in FIG. 4 are, for example, Ethernet LANs operating according to the IEEE 802.3 specification, which is incorporated by reference herein; however, other types of local area networks may also be used. The first local area network 412 uses the router 413 to provide the first data network telephone 408 and the first network telephony connection server 450 with access to the data network 406. For example, the router 413 may perform routing functions using protocol stacks that include the Internet Protocol and other protocols for communicating on the Internet. Similarly, the second local area network 414 uses the router 415 to provide the second data network telephone 418 and the second network telephony connection server 438 with access to the data network 406.

The first, second, and third network telephony connection servers 450, 438, and 437 provide telephony registration, location, and session initiation services for voice connections in which at least one of their members is a party. For example, a user of the first data network telephone 408 may register for telephony service with an administrator of the first network telephony connection server 450 and receive a user identifier and a telephone identifier. The user identifier and telephone identifier may be sequences of unique alphanumeric elements that callers use to direct voice connections to the user. The network telephony connection servers register users by storing user records in registration databases (not shown in FIG. 4) associated with each of the network telephony connection servers, in response to registration requests.

The call setup process and the user and telephone identifiers preferably conform to requirements defined in a call-management protocol. The call-management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a voice-over-data communications channel. The voice data communications channel incorporates other data transport and data formatting protocols, and preferably includes well-known data communications channels typically established over the Internet.

The call management protocol used in FIG. 4 is the Session Initiation Protocol (SIP), which is described in M. Handley et al., "SIP: Session Initiation Protocol," IETF RFC 2543, March 1999, incorporated by reference herein; however, any other such protocol may be used. Other protocols include H.323, MEGACO, the Media Gateway Control Protocol (MGCP), etc.

The network telephony connection servers 450, 438, and 437 may be used to provide telephony service for mobile users. For example, a user may be registered to use the first network telephone 408 (which is identified by its telephone identifier), but the user may move to a location near a second network telephone (not shown) on the first local area network 412. The user may re-register as the user of the second network telephone. The user would then become associated with the second network telephone. Calls that identify the user by the user's user identifier may then reach the user at the second network telephone.

4. Cable Network as an Exemplary Access Network

The system 400 in FIG. 4 also shows the cable network 416 connected to the data network 406 by a router 417. The cable network 416 provides data network access to its network elements, which in FIG. 4 include the third data network telephone 428 and the third network telephony connection server 437. A user of the third data network telephone 418 connected to the cable network 416 may communicate by telephone over the data network 406 with the users of the first and second data network telephones 408 and 418 connected to the first and second local area networks 412 and 414.

The cable network 416 may include any digital cable television system that provides data connectivity. In the cable network 416, data is communicated by radio frequency in a high-frequency coaxial cable. The cable network 416 may include a head-end and/or a central termination system that permits management of the cable connections to the users.

5. Providing Telephony Services

The third network telephony connection server 437 is preferably a SIP-based server that performs call initiation, maintenance, and teardown for the third data network telephone 428 connected to the cable network 416. The third network telephony connection server 437 may be similar or identical to the first and second network telephony connection servers 450 and 438 connected to the first and second local area networks 412 and 414.

The system 400 shown in FIG. 4 includes a data network telephony system that permits the first and second data network telephones 408 and 418 connected to the local area networks 412 and 414 to communicate through the data network 406 with the third data network telephone 428 connected to the cable network 416. The system shown in FIG. 4 uses SIP in order to establish, maintain, and tear down telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection servers 450, 437, and 438. Not all server types are required to implement the various embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Figure 5:
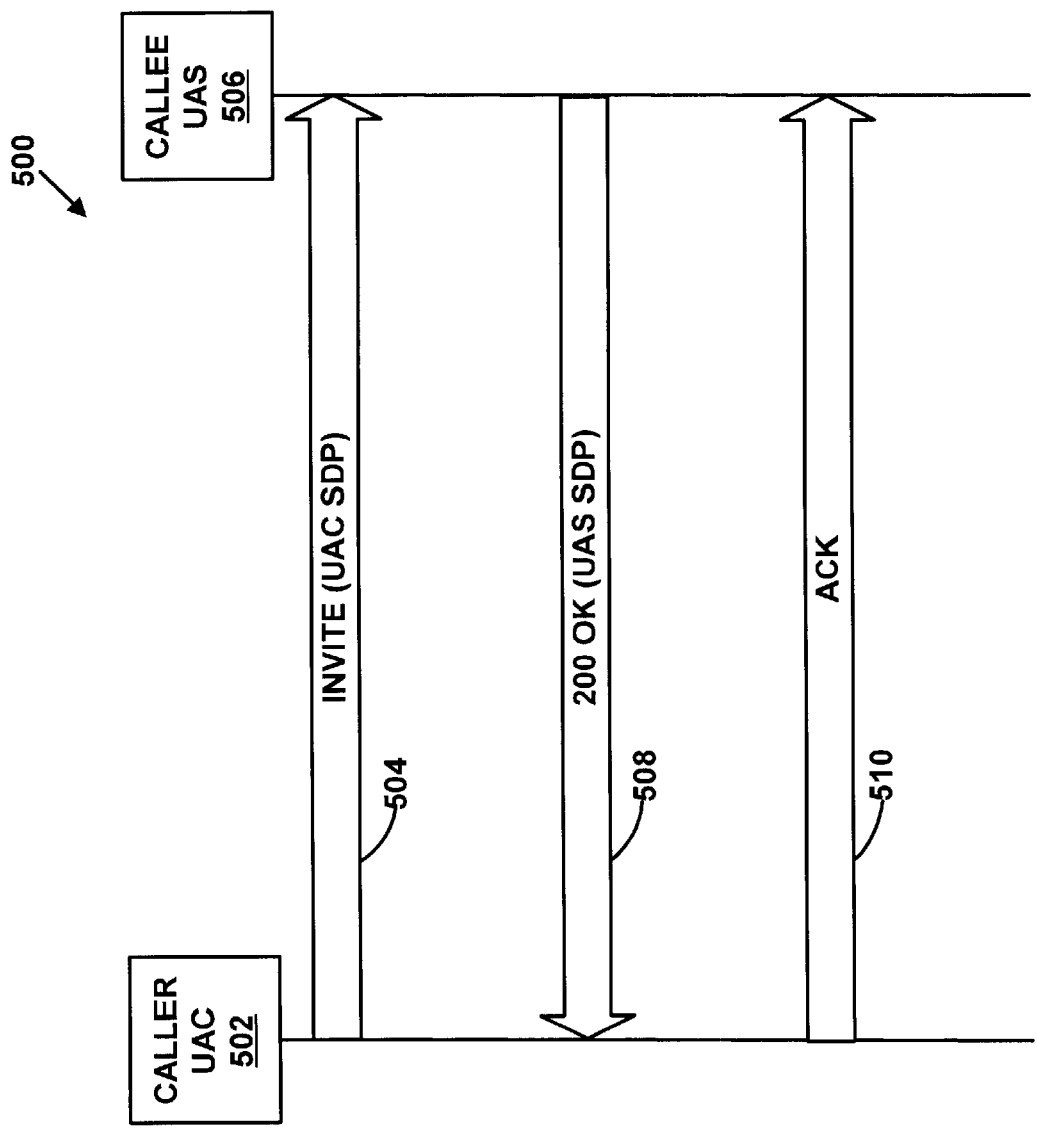
FIG. 5 is a message flow diagram showing an exemplary SIP call setup operation.

FIG. 5 is a message flow diagram showing an exemplary SIP call setup operation 500. A SIP caller UAC 502 sends an INVITE message 504 to a SIP callee UAS 506. (The proxy server is not shown in this illustration). The INVITE message 504 contains session description information (UAC SDP) for the caller UAC 502. The callee UAS 506 sends a 200-OK message 508 to the caller UAC 502. The 200-OK message 508 contains session description information (UAS SDP) for the callee UAS 506. The caller UAC 502 sends an ACK message 510 to the callee UAS 506 to complete the session initiation operation.

Redirect servers may be used to process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can either be forking or non-forking. A forking proxy can, for example, ring several phones at once until somebody takes the call. Registrar servers are used to record the SIP address (called a SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the first local area network 412, the central registrar/proxy server, such as the first network telephony connection server 450, is the primary destination of all SIP messages trying to establish a connection with users on the first local area network 412. Preferably, the first network telephony connection server 450 is also the only destination advertised to the SIP clients outside the first local area network 412 on behalf of all the SIP clients residing on the first local area network 412. The network telephony connection server 450 relays all SIP INVITE messages to the appropriate final destination (or another SIP proxy), based on a database lookup using a first SIP database (not shown) associated with the first network telephony connection server 450. This allows mobile clients to be registered to their current locations.

Similarly, the second network telephony connection server 438 is the primary destination of all SIP messages trying to establish a connection with SIP clients such as the data network telephone 418, connected to the second local area network 414. Preferably, the second network telephony connection server 438 is also the only destination advertised to the SIP clients outside the second local area network 414 on behalf of all the SIP clients (e.g. data network telephones) residing on the second local area network 414. The second network telephony connection server 438 relays all SIP INVITE messages to the appropriate final destination (or another SIP proxy), based on a database lookup using a second SIP database. The third network telephony server 437 behaves similarly to the first and second network telephony connection servers 450 and 438. The use of three servers is for illustrative purposes only, and other server configurations may also be used.

The data network telephones 408, 418, and 428 in the system 400 preferably have pre-programmed device identifiers (e.g. phone numbers), represented as SIP-URL's that are of the form sip: user@domain. An example is sip: 1234567890@3Com.com. After power-up, each of the data network telephones 408, 418, and 428 sends a SIP REGISTER message to the default registrar, such as the network telephony servers 450, 438, and 437. When a call arrives at one of the network telephony servers 450, 438, or 437 for any of the registered SIP URLs, the server will forward the call to the appropriate destination. If a data network telephone is moved to a new location, all calls to the associated SIP URL will still be properly routed to that device. In other words, the system in FIG. 4 provides device mobility in the sense that calls will "follow" the data network telephone according to its SIP URL. This is especially useful if the data network telephone 408, 418, or 428 is running the DHCP (Dynamic Host Configuration Protocol) so that when the location is changed, the IP address is also automatically changed.

An advantage of the system in FIG. 4 is that once the call is established between data network telephones, the data network 406 provides data connectivity for up to a plurality of data communications channels. For example, the data network telephones 408, 418, and 428 can communicate voice signals as voice-over-data packets on a voice-over-data channel. The data network telephones 408, 418, and 428 may also be able to communicate PID data as PID data packets on a PID data channel. An example of PID data is graphical drawing data that is input into a PDA with a stylus device. Another example of PID data is one of the call participants' contact information, which may be passed on to the other participants. Other data types may also be communicated. If PID data is input into the PID 410, the PID data may be communicated to and from the PID 410 across link 409 to the data network telephone 408, where the PID data may be assembled into packets and disassembled from packets as part of the process for communicating the PID data packets across the data network 406 and any access networks, such as the first Ethernet LAN 412, the second Ethernet LAN 414, and the cable network 416. For example, the PID data may be communicated to and from at least one other PID (not shown) through a network device (such as a data network telephone) located in the system 400.

6. The Data Network Telephones

The data network telephones 408, 418, and 428 are preferably telephones that include an Ethernet communications interface for connection to an Ethernet port. The Ethernet phones in FIG. 4 support the Internet Protocol (IP), using an IP address that is either statically configured or obtained by access to a Dynamic Host Configuration Protocol (DHCP) server.

Figure 6:
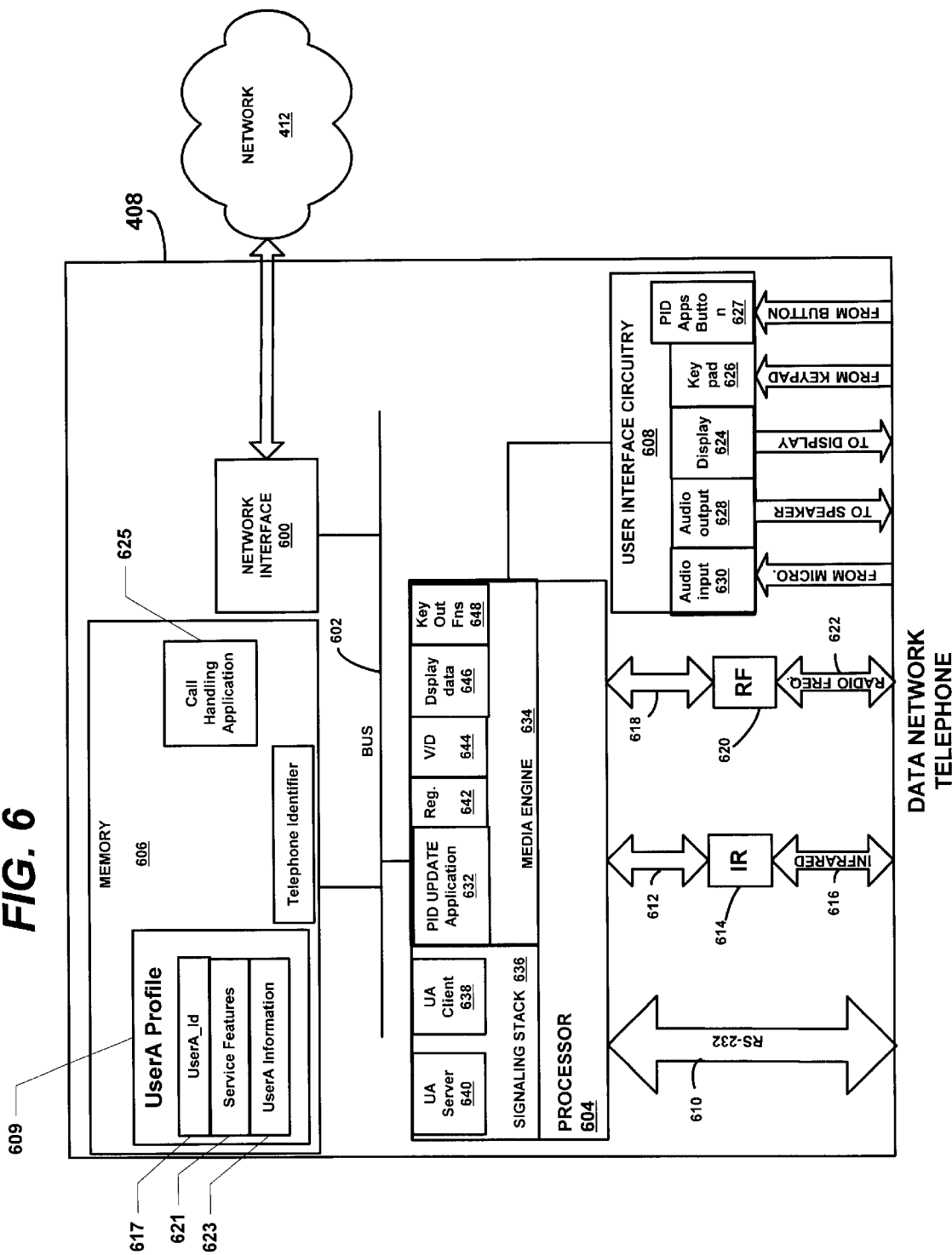
FIG. 6 is a block diagram of a data network telephone according to an exemplary embodiment of the present invention.

FIG. 6 is a block diagram showing the first data network telephone 408 connected to the local area network 412 in FIG. 4. The voice communication devices 108, 118, 208, 212, 214, 216, 218 may be implemented using the concepts shown in FIGS. 4 and 6. The data network telephone 408 in FIG. 6 is connected to the LAN 412 by a network interface 600. The network interface 600 may, for example, be a network interface card, and may be in the form of an integrated circuit. A bus 602 may be used to connect the network interface 600 with a processor 604 and a memory 606. Also connected to the processor are user interface circuitry 608 and three alternative interfaces 610, 612/614/616, and 618/620/622 to a PID, such as the first PID 410. Other connection schemes may also be used.

The memory 606 may also include a call handling application 625, which includes a copy of a PID address/appointment book on a call handling database. The call handling application 625 on the data network telephone 408 performs any screening functions that have been set up on the PID. The user may set priority levels for entries in the contacts or address book application in the PID and transfer the settings as priority information to the data network telephone on the PID interface. The data network telephone 408 enforces the settings. For example, assume that the user receives a telephone call from a User B, which corresponds to an entry in the call handling database maintained by the call handling application 625. The call handling application 625 determines User B's priority level and acts in accordance with the priority level set. If the priority level is normal such that it User B calls may ring any time, the data network telephone 408 will notify the user of the call request, possibly by ringing and displaying the call. If the priority level is set to "do not disturb" for User B, the data network telephone 408 may generate a busy signal, or may proceed to voice mail.

The first alternative interface 610 includes an RS-232 serial connection and associated coupling hardware and mechanisms. The first alternative interface 610 may, for example, be a docking cradle or cable for a PID, such as a PDA (Personal Digital Assistant), in which information may be transferred between the PID and the first data network telephone 408.

The second alternative interface comprises a first connection 612, such as an RS-232 connection, along with infrared circuitry 614 for converting signals into infrared output and for accepting infrared input. An infrared interface 616 may also be included within the second alternative interface.

The third alternative interface comprises a first connection 618, such as an RS-232 connection, along with radio-frequency circuitry 620 for converting signals into radio frequency output and for accepting radio frequency input. A radio frequency interface 622 may also be included as part of the third alternative interface.

The three alternative interfaces described above are merely examples, and additional means for implementing the interface between the data network telephone 408 and the PID may also be used. Although three interfaces are shown in FIG. 6, there may be only one such interface in the data network telephone 408. More than one interface may be included to improve flexibility and to provide redundancy in case of failure of an interface.

The user interface circuitry 608 includes hardware and software components that access the functions of the handset, display, and keypad to provide user input and output resources for functions in the processor 604. It is important to note that none of the handset, display, and keypad need be present in the data network telephone 408, and alternative user interface mechanisms may be used. As an example, the user interface circuitry may include a display interface 624, a keypad interface 626, an audio output interface 628, and an audio input interface 630.

For some applications, the user interface circuitry 608 may only need to support sending or receiving, but not both. The user interface circuitry 608 preferably supports the sending and receiving of at least audio information. For example, in the case where the data network telephone 408 is a voice communication device, the user interface circuitry may include a microphone, a speaker, and analog interface circuitry. A videophone implementation might also include a camera and monitor. The data network telephone 408 is not limited to telephones or videophones—additional user interface types, for example, such as the ones needed for computer games, (e.g. a joystick, or virtual reality headset) are also contemplated as being within the scope of the present invention.

The audio input interface 630 may receive voice signals from a microphone or other audio input device and convert the signals to digital information. The conversion preferably conforms to the G.711 ITU-T Standard. Further processing of the digital signal may be performed in the audio input interface 630, such as to provide compression (e.g. using the ITU-T G723.1 standard) or to provide noise reduction, although such processing may also be performed in the processor 604. Alternatively, the audio input interface 630 may communicate an analog voice signal to the processor 604 for conversion to digital information.

The audio output interface 628 receives digital information representing voice from the processor 604 and converts the information to sound. In one embodiment, the audio output interface 628 receives information in the form of G.711 although other processing such as decompression may be performed in the audio output interface 628. Alternatively, the processor 604 may convert digital information to analog voice signals and communicate the analog voice signals to the audio output interface 628.

The keypad interface 626 and the display interface 624 include well-known device interfaces and respective signal processing techniques. The user interface circuitry 608 may support other hardware and software interfaces.

The user interface circuitry 608 may include a PID applications button 627, which when actuated by the user, initiates an update of the application(s) on the PID. The PID applications button 627 preferably calls a function that retrieves the PID applications from memory 606 for download to the PID. The PID applications button 627 may be implemented as a display button, such as a descriptive alphanumeric string that may be underlined, or otherwise highlighted to indicate that the user may press there. The PID applications button 627 may also be implemented as a key on the keypad 626.

The processor 604 may consist of one or more smaller processing units, including, for example, a programmable digital signal processing engine. In the preferred embodiment, the processor is implemented as a single ASIC (Application Specific Integrated Circuit) to improve speed and to economize space.

The processor 604 also may include an operating system, and application and communications software, firmware, or hardware for implementing the functions of the first data network telephone 408. For example, the processor may include a conferencing application to assist a user of the data network telephone 408 in gathering communication partner data from a PID and to establish a conference call by connecting the conference call parties.

The processor 604 may also include the PID update application 632 that downloads the PID applications stored in memory 606 to the PID. The PID update application 632 preferably responds to a user actuation of the PID applications button 627. When actuated, the PID update application 632 retrieves the PID applications 632 in memory 606 for download to the PID over one of the alternative interfaces. The PID update application 632 may also include a function that searches for upgrades to the PID applications on a server on the network 412.

Other applications may also be processed by the data network telephone 408.

The operating system may be any suitable commercially available embedded or disk-based operating system, or any proprietary operating system. For example, the Windows 9x/NT, Unix, Mac OS, DOS, a real-time embedded operating system, etc.

The processor 604 preferably includes a media engine 634 and a signaling stack 636 to perform the primary communications and application functions of the data network telephone 408. The purpose of the signaling stack in an exemplary data network telephone 408 is to set up, manage, and tear down a call. During the setup phase, a user may use the keypad to enter a user identifier to call. The signaling stack 636 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice over data channel is established. During the management phase, for example, other parties are invited to the call if needed. During the teardown phase, the call is terminated.

The call-management protocol used in the exemplary data network telephone 408 in FIG. 3 is the SIP protocol. In particular, the signaling stack implements a User Agent Client 638 and a User Agent Server 640, in accordance with the SIP protocol. Alternative call-management protocols, such as the ITU-T H.323 protocol and others, may also be used to implement the present invention.

Once the call is set up, the media engine 634 manages the communication over a data communications channel using a network transport protocol and the network interface 600. The media engine 634 sends and receives data packets having a data payload for carrying data and an indication of the type of data is being transported. The media engine 634 in the data network telephones 408 may sample the voice signals from the audio input 630 (or receive voice samples from the audio input 630), encode the samples, and build data packets on the sending side. On the receiver side, in addition to performing the reverse operations, the media engine also preferably manages a receiver buffer to compensate for network jitter.

The media engine 634 preferably includes hardware and software components for conferencing 632, performing registration functions 642, voice-over-data functions 644, display data functions 646, and keypad output functions 648. The media engine 634 processes data that is received from the first local area network 412, and data that is to be sent over the first local area network 412.

For data that is received from the first local area network 412, the media engine 634 may determine from the type of data in the packet whether packets contain sampled voice signals or data for performing other functions. For example, packet headers or trailers may contain an indication of data type. Packets containing sampled voice signals are processed by voice over data function 644. The voice over data function 644 preferably conforms to a protocol for formatting voice signals as digital data streams. While any suitable protocol may be used, the media (voice signal) is preferably transported via the Real Time Protocol (RTP), which itself is carried inside of User Datagram Protocol (UDP). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 408 with a network telephony service are processed by the registration function 642. By registering the data network telephone 408, a user may establish with the network telephony service provider that calls addressed to the user's user identifier may be connected to the data network telephone 408. Registration may occur when the data network telephone 408 sends a request to register to a service provider host. The service provider host may respond by setting the user's user identifier to correspond to the telephone identifier of the data network telephone 408, and by acknowledging the request with a status message to the data network telephone 408. In one embodiment, a request to register the data network telephone 408 to a default user is automatically sent during power-up of the data network telephone 408. As a result, the user becomes associated with the data network telephone 408.

Other features may be added to the registration functions 642, or implemented as extensions to the registration functions 642. For example, the data network telephone 408 may be provisioned to provide selected network telephony services by establishing a data connection with a service provider, requesting the selected services, and receiving data that ensures that the services have been successfully provisioned. Such services may include, for example, caller identification, call forwarding, voice mail, and any other service offered by the network telephony service provider to enhance the capabilities of the data network telephone 408. One advantage of such provisioning functions is that services may be ordered for temporary use in a manner that is convenient to the user.

Packets containing data for display on the display device are processed by the display data function 646. The display data function 646 may be used for displaying, for example, the name(s) and user identifier(s) of the other party(-ies) to the call, the status of the telephone call, billing information, and other information For data that is to be sent over the data network 406, the media engine 634 formats the data as data packets in accordance with a selected protocol. The placement of data into packets may also be performed elsewhere in the data network telephone 408. The selected protocol is preferably the protocol that is supported by the data network telephone that will receive the data for the particular type of data being transported.

The voice-over-data function 644 formats voice samples according to the protocol used by the receiving data network telephone. In one preferred embodiment, the voice over data function 644 formats voice samples as RTP packets. The registration function 642 and the keypad output function 648 may control the transport of data that does not represent voice signals.

The second and third data network telephones 418 and 428 are preferably similar or identical to the first data network telephone 408.

7. The Portable Information Device (PID)

Figure 7:
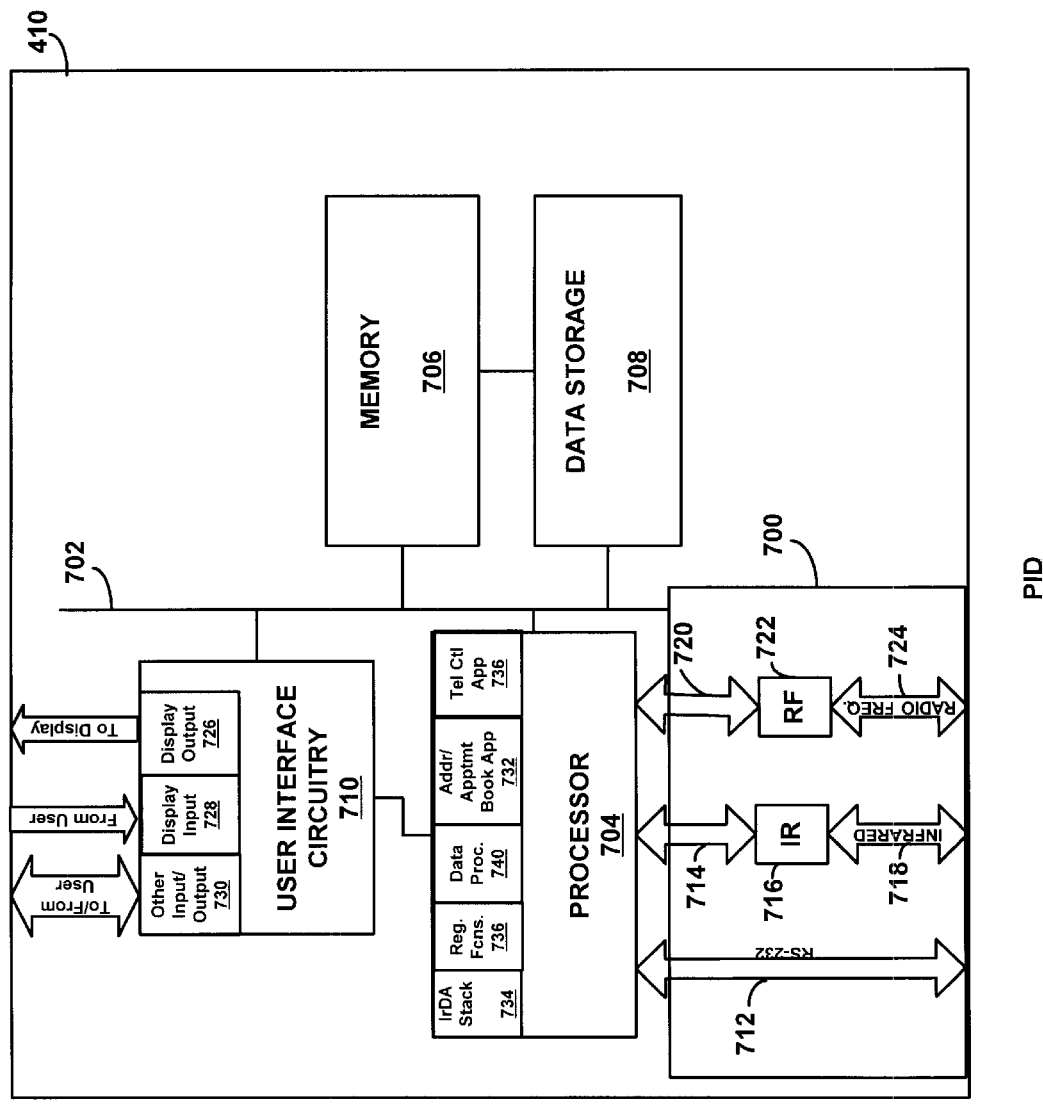
FIG. 7 is a block diagram of a portable information device (PID) according to an exemplary embodiment of the present invention.

FIG. 7 is a block diagram showing one embodiment of the PID 410. The PID 410 may be linked to the data network telephone 408 through a point-to-point interface 700. A bus 702 may be used to connect the point-to-point interface 700 with a processor 704, a memory 706, data storage 708, and user interface circuitry 710.

The memory 706 includes a user profile 707 that preferably includes a user's user identifier, a set of telephony service features and user information. The user profile may be used by applications on the PID 410 to perform telephony functions. For example, an application on the PID 410 may be used to transfer the user profile, in whole, or in part, to a data network telephone via the PID link interface.

The memory 706 also includes application data for PID applications. For example, the PID 410 in FIG. 7 includes an address book and/or appointment application 732 that uses the memory 706 to store data relating to contacts and appointments.

The point-to-point interface 700 shown in FIG. 4 illustrates three alternative interfaces 712, 714/716/718, and 720/722/724 to a data network telephone.

A first alternative interface 712 includes an RS-232 serial connection and associated coupling hardware mechanisms. The first alternative interface 712 may, for example, be a docking cradle or cable for a PID, in which information can be transferred between the PID 410 and the first data network telephone 408.

The second alternative interface comprises a first connection 714, such as a RS-232 serial connection, along with infrared circuitry 716 for converting signals into infrared output and for accepting infrared input. An infrared interface 718 may also be included within the second alternative interface.

The third alternative interface comprises a first connection 720, such as an RS-232 connection, along with radio-frequency circuitry 722 for converting signals into radio frequency output and for accepting radio frequency input. A radio frequency interface 724 may also be included as part of the third alternative interface.

The three alternative interfaces described above are merely examples, and additional means for implementing the interface between the PID 410 and the data network telephone 408 may also be used. Although three interfaces are shown in FIG. 4, there may be only one such interface in the PID 410. More than one interface may be included to improve flexibility and to provide redundancy in case of failure of an interface.

The user interface circuitry 710 includes hardware and software components that provide user input and output resources for functions in the processor 704. The user interface circuitry preferably includes a display output 726, a display input 728, and an additional input/output interface 730.

The display output 726 preferably receives digital information representing graphical or other data from the processor 704 and converts the information, such as text and/or images, for display on a graphical display, such as an LCD or TFT screen.

The display input 728 may receive PID data inputs from a user of the PID 410. The PID data inputs are preferably entered by the user with a stylus on a pressure-sensitive display screen. Alternately, a keyboard may be used to accept user input. Similarly, the display output 726 preferably displays the PID data on the display screen.

The additional input/output interface 730 allows the user to enter other types of data besides PID data into the PID 410. For example, audio data, additional PID data, or additional input may be entered through the additional input/output interface 730. Touch-sensitive screen buttons are an exemplary method for a user to enter control data into the PID 410.

The processor 704 includes an operating system and application and communication software, firmware, or hardware to implement the functions of the PID 410. The operating system may be any suitable commercially available operating system, or any proprietary operating system. The operating system and software may be stored on data storage 708.

An address and/or appointment book application 732 is included to manage the user's contacts and appointments. The address and/or appointment book application 732 is preferably enhanced to perform telephony-related applications. For example, the address and/or appointment book application 732 may include functions that will establish a connection to the data network telephone 408 (in FIG. 6) on one of the alternative interfaces (preferably the infrared interface) and perform a telephony-related function. One such function instructs the data network telephone 408 to dial the telephone number corresponding to an entry in the address book. The instruction to dial may be transmitted by merely selecting the telephone number.

Another function includes a screening function that allows a user to select priority levels for one or more entries in the address/appointment book 732. The priority level may indicate the relative importance of calls from an individual or appointment corresponding to the address and/or appointment book entry. A "settings transfer" function may be selected to transfer the priority level selections to the data network telephone 408. In certain situations, the data network telephone 408 may notify the user of calls received from high priority callers while providing a busy-signal, or invoking a voice mail function for callers of lower priority.

Similarly, a conferencing application (not shown) may be included to allow a user to select communication partners to be invited to a conference call initiated by the user of the PID 410. Many other applications are also possible, and further examples of applications suitable for a PID may be found at http://www.palm.com, http://www.palmcentral.com, or http://www.tucows.com.

Although the processor 704 is shown connected to the data storage 708 through a bus 702, other configurations may also be used. Similarly, the memory 706 may be alternatively configured, and may be embedded within the processor 704.

The PID 410 is operable to send data to and receive data from the data network telephone 408 across a point-to-point link, such as the point-to-point link 409. For example, a user enters PID data at the display input 728. The PID data may be processed in the user interface circuitry 710 or it may go directly to the processor 704 or the memory 706. The processor 704 may also perform such processing functions as compression. A PID data application may be used to implement the display input, the display output, and the processing functions.

As an example, a drawing application may be used to accept PID data input at the display input 728 from a user drawing with a stylus on a display screen (if one exists) of the PID 410. A drawing application could then display the drawing through the display output 726 to enable the user to see a visual representation of the drawing. If the user desires to share the drawing with a second user on the system 400, where the second user is using a second PID, the PID data from the drawing application can be transmitted through one of the point-to-point interfaces 700, allowing the data to be received by the data network telephone 408. An application in the data network telephone 408 receives the PID data across the point-to-point link, and the PID data is prepared for transmission across the data network 406, such as by the media engine 634 shown in FIG. 6. Preferably the PID data is converted to PID data packets and is communicated on a PID data channel across the first LAN 412 through the router 413 across the data network 406 and eventually to a network device at which the second PID is located.

The point-to-point link 409 may be implemented as a serial bit stream between an application in the PID 410 and an application in the first data network telephone 408. For example, the link 409 could be an infrared link that is implemented with minimal stack interpretation. However, the infrared link 409 between PID 410 and the first data network telephone 408 can alternatively be implemented using all or parts of a specialized protocol, such as the Infrared Data Association (IrDA) protocol stack, where data is interpreted through the stack between application-layer processes at each end of the link.

Figure 8:
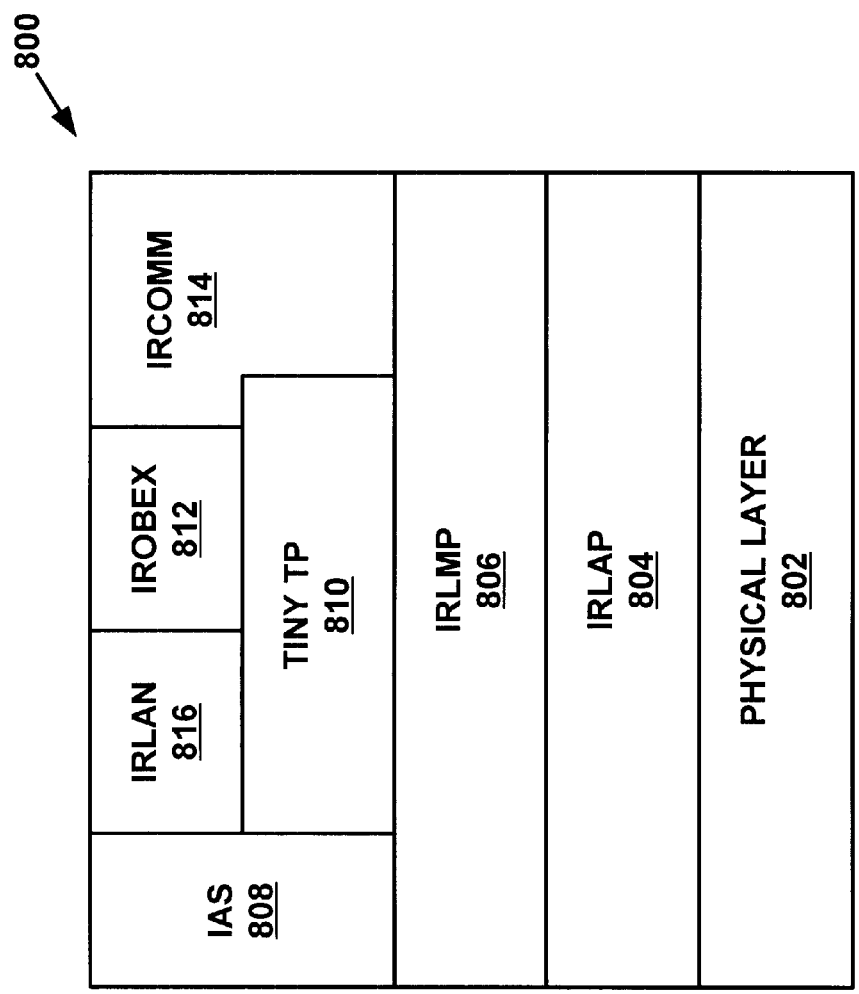
FIG. 8 is a stack layer diagram showing the layers of an IrDA stack.

FIG. 8 is a protocol diagram illustrating the layers of the IrDA protocol stack. An IrDA stack is implemented at each of the connection endpoints of an IrDA link. The required layers of an IrDA protocol stack are the physical layer 802, the IrLAP layer 804, the IRLMP layer 806 and the IAS layer 808. The physical layer 802 specifies optical characteristics of the link, encoding of data, and framing for various speeds. The IrLAP (Link Access Protocol) layer 804 establishes the basic reliable connection between the two ends of the link. The IrLMP (Link Management Protocol) layer 806 multiplexes services and applications on the IrLAP connection. The IAS (Information Access Service) layer 808 provides a directory or "yellow pages" of services on an IrDA device.

The IrDA protocol also specifies a number of optional protocol layers, these protocol layers being TinyTP 810, IrOBEX 812, IrCOMM 814 and IrLAN 816. TinyTP (Tiny Transport Protocol) 810 adds per-channel flow control to keep traffic over the IrDA link moving smoothly. This important function is required in many cases. IrOBEX (Infrared Object Exchange protocol) 812 provides for the easy transfer of files and other data objects between the IrDA devices at each end of the link. IrCOMM 814 is a serial and parallel port emulation that enables existing applications that use serial and parallel communications to use IrDA without change. IrLAN (Infrared Local Area Network) 816 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

In one embodiment, the data network telephones 408, 418, and 428 merely provide a data tunnel for the data channel attendant to the infrared links, while the IrDA protocol stack is implemented at endpoint PID devices, such as PID 410. Alternatively, IrDA stacks can be implemented in the data network telephones as well. By implementing additional layers of the IrDA protocol stack, the PID applications and the base applications in the data network telephones can be simplified because the IrDA protocol layers take over certain functions. For example, the IrDA protocol stack can be implemented at each PID used in a conference call, and the IrOBEX layer 812 can be used to transfer text and graphics object files, such as drawings or electronic business cards, end-to-end between PID devices connected via data network telephones and networks.

Figure 9:
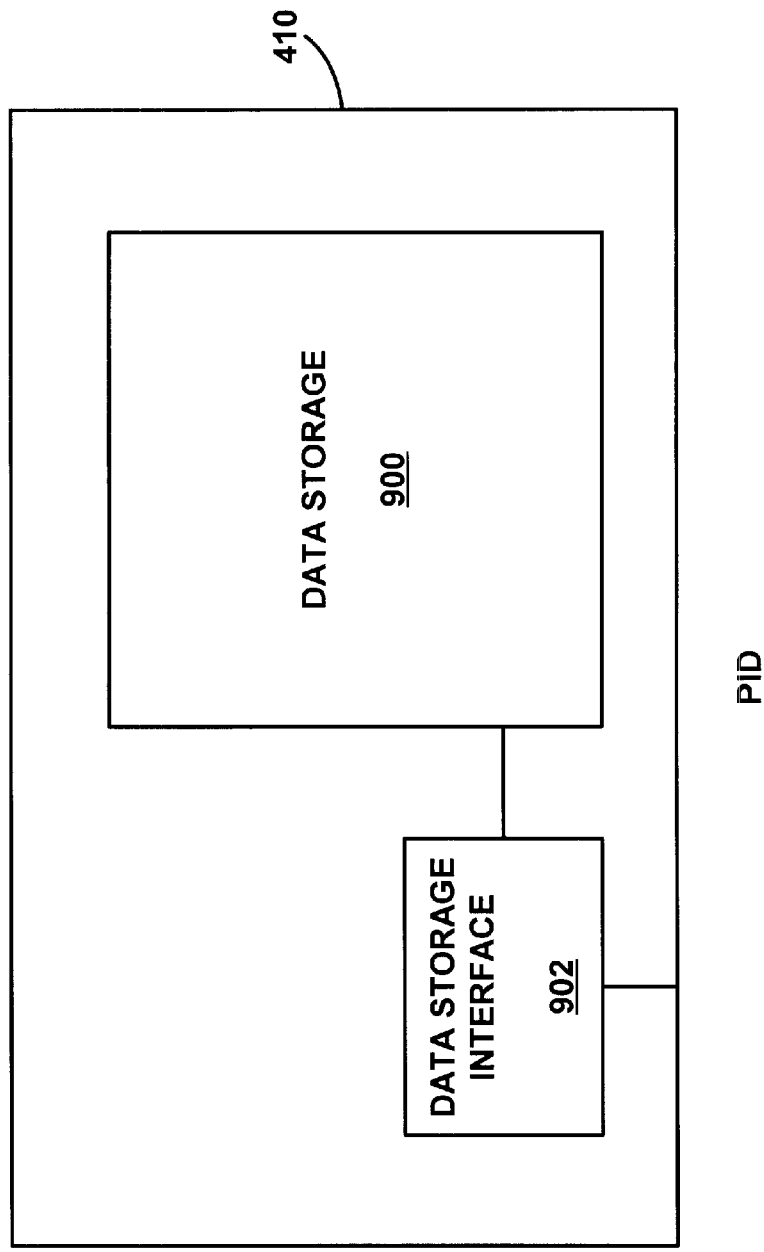
FIG. 9 is a block diagram of a portable information device (PID) according to an alternative embodiment of the present invention.

FIG. 9 shows a second embodiment of PID 410 according to the present invention. The PID 410 may be part of a more complex device, such as a portable phone. The PID 410 might also be a simple data storage object, such as a smart card or a computer disc. Included within the PID 410 are a data storage unit 900 and a data storage interface 902.

The data storage unit 900 contains a user information database. The user information database contains user information such as personal address and schedule information, for example, including priority information that may be transmitted to the data network telephone to enable call screening.

The data storage interface 902 provides access to the data stored in the data storage unit 900. The complexity of the data storage interface 902 will depend on what reading or modifying tasks are performed by an outside device, such as a voice communication device or data network telephone, as compared with which tasks are performed by the PID 410. If the PID 410 is a simple computer disk or smart card, the data storage interface may be primarily mechanical in nature, so that the PID 410 is in position to read or modify user information contained in the data storage unit 900. If the PID 410 is more complex, then the data storage interface may include circuitry, possibly for reading or modifying the stored information. Infrared, magnetic, or radio frequency technology may be used to implement the data storage interface 902, for example.

Other implementations of PIDs may be used besides those described with reference to FIGS. 7 and 9. The PID will preferably include a user information database stored in data storage or memory, and should include a means for allowing an outside device to read and possibly modify the user information contained in the user information database. In one alternative embodiment, the PID 410 is a personal computer (PC) and associated applications, in which case the PID 410 need not be easily moved from one location to another.

Many alternative embodiments are also made possible by utilizing the PID 410. For example, the PID 410 may store and download to the data network telephone 408 the preferences of the user about the phone operation, such as the ringer volume and tone. The PID 410 may also act as a smart card, providing authentication information for making toll calls. In another embodiment, the user of the PID 410 may program the system through the PID 410 so that, depending on the time of day, and on the datebook information in the PID 410, the phone forwarding information is dynamically updated. For example, during business hours, the default location to forward calls could be set to be the user's office, and during other hours, their cellular phone or their pager. If the PID 410 has voice playback capability, it can download voice mail and play it back off-line. On a LAN, this would be implemented as a file transfer, which is much faster than playing audio back. This feature would be useful if the user cannot spend too much time on the phone to check their voice mail. For example, a traveler at an airport may download their 30 minutes worth of voice mail in a few minutes, just before taking their flight, and may listen to those messages during the flight.

8. Providing User Mobility and Call Handling Services

Figure 10:
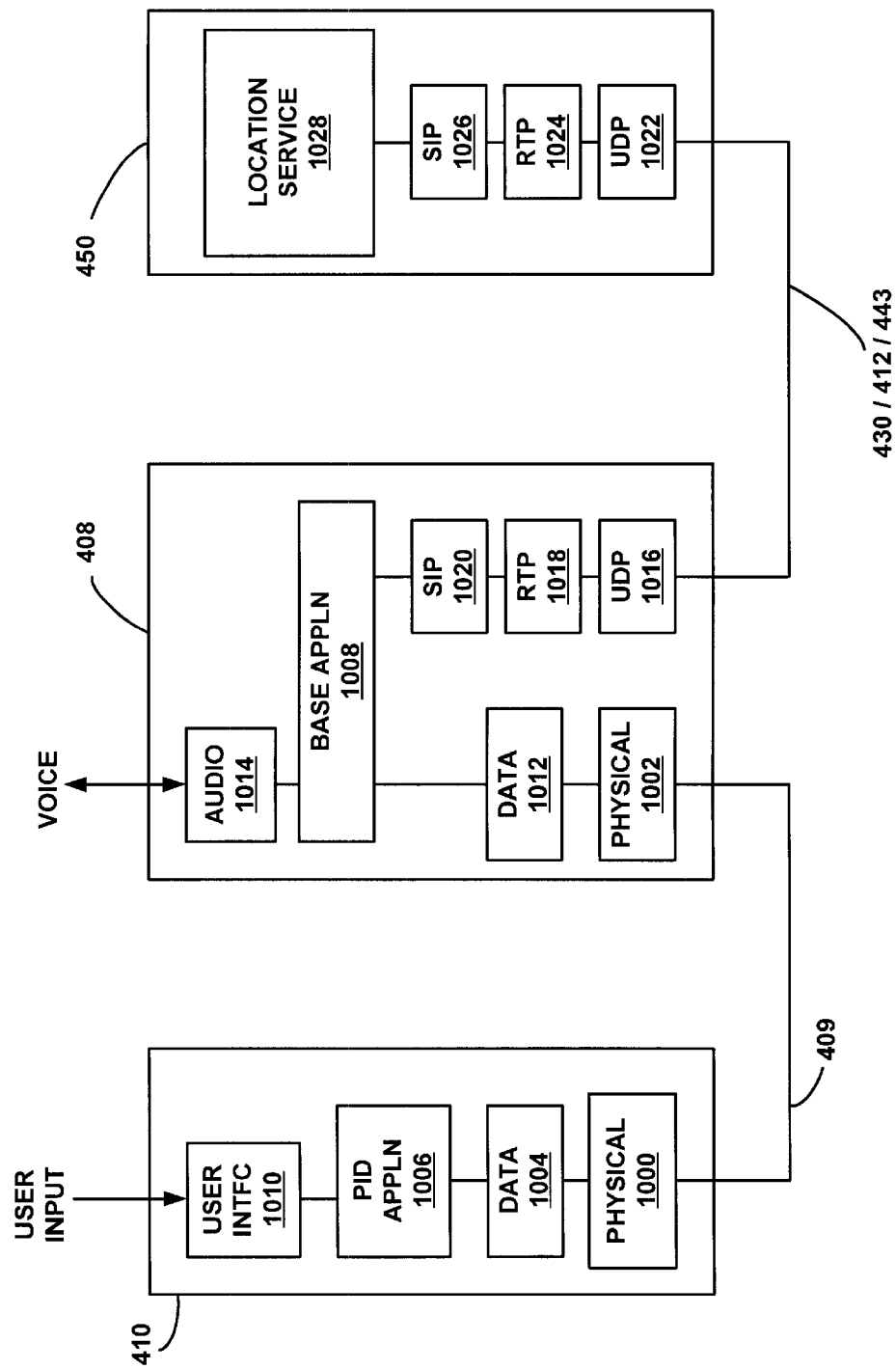
FIG. 10 is a block and stack layer diagram illustrating the protocol stacks in an exemplary embodiment of a PID linked to a data network telephone.

FIG. 10 is a functional block diagram and protocol stack diagram illustrating an embodiment of the protocol stacks in the PID 410 and the first data network telephone 408 that support link 409. The point-to-point interface circuitry 700 in the PID 410 provides the physical layer 1000, such as that specified by the Infrared Data Association (IrDA) or Bluetooth, that connects via link 409 to the point-to-point interface circuitry 608 implementing a physical layer 1002 in the first data network telephone 408. The data link layer 1004 in PID 410 provides data link control for link 409 in transferring data to and from a PID application client 1006. Similarly, the first data network telephone 408 includes a data link layer 1012 and a base application server 1008 that is configured to synchronize connection and other functions with the PID application 1006 in PID 410. For example, address and/or appointment book entries may be transferred between the PID 410 and the data network telephone 408, preferably with priority information to assist in call handling, such as call screening.

When the PID 410 is activated, either through power-up or through a user input at the user interface 1010, the application client 1006 in the PID 410 may send the user's SIP URL across the link 409 to the first data network telephone 408, where it is received by the application server 1008. The base application server 1008 sends the SIP URL received from the PID 410 across connection 430 and the Ethernet LAN 412 through connection 443 to the network telephony connection server 450. The network telephony connection server 450 may store the SIP URL and the IP address of the associated data network telephone 408 in a SIP database (not shown) so that the SIP URL is listed as being resident at the IP address of the data network telephone 408. (If the network telephony connection server 450 uses a location server for registration/location tasks, the registration information might instead be stored with such a location server). SQL (Structured Query Language) is preferred for implementing and maintaining the database. Once the PID 410 is registered with the network telephony connection server 450, calls to the SIP URL for PID 410 (or the user of the PID 410) will be directed to the first data network telephone 408.

Figure 11:
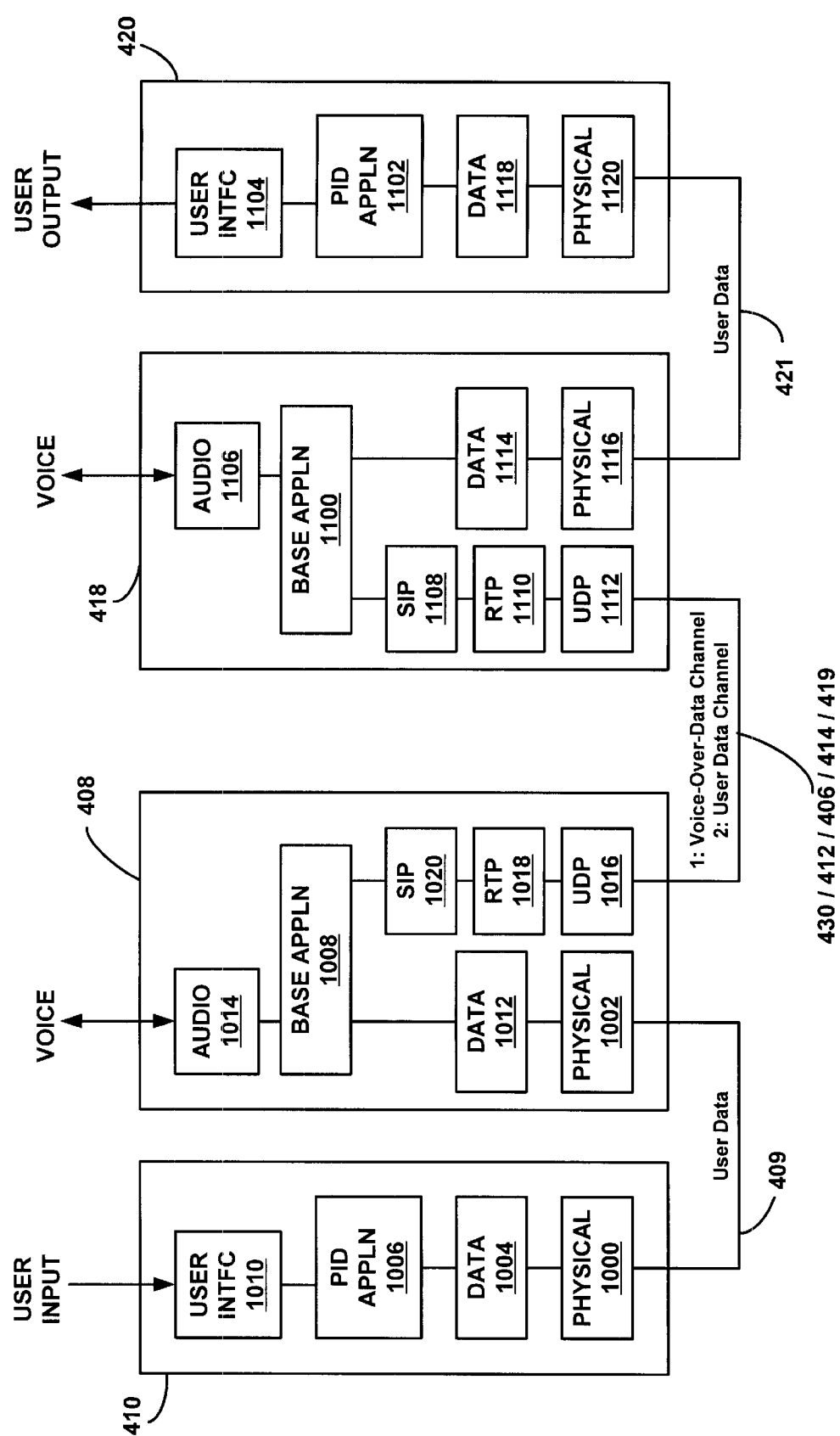
FIG. 11 is block and stack layer diagram illustrating an embodiment of the present invention in which a SIP call may be established.

FIG. 11 is a functional block and protocol stack diagram illustrating an embodiment of the present invention in which a SIP connection is established from the first data network phone 408 to the second data network phone 418 through network connection 430, first access network 412, data network 406, second access network 414 and network connection 419. The routers 413 and 415 and associated connections are not shown to simplify the block diagram representation. Although only two data network telephones are shown in FIG. 11, a three-party conference call would look very similar to what is shown in FIG. 11, with the addition of an additional data network telephone. The first PID 410 and a second PID 420 are also shown for exemplary purposes, but need not be included for most embodiments. The PIDs 410 and 420 would be utilized for data transfers to and from the respective data network telephones 408 and 418.

The diagram of FIG. 11 shows how PID user data can be communicated from one PID to another PID during a call in one aspect of the present invention. The PID application 1006 in PID 410 is configured to send PID data received through the user interface 1010 through link 409 to base applications 1008 in the first data network phone 408. In this embodiment, base applications 1008 are configured to define data channels for transport to base applications 1100 in the second data network telephone 418.

Multiple data channels in SIP may be defined through the Session Description Protocol described in RFC 2327, herein incorporated by reference. Included in a SIP INVITE request are options for the requested connection that describe the number and type of media streams. Each media stream is described by an "m=" line in the INVITE request. For example, a request for a connection that includes an audio stream and a bidirectional video stream using H.261 might look like this:

TABLE 1 v = 0
o = alice 2890844526 2890844526 IN IP4 host.anywhere.com
c = IN IP4 host.anywhere.com
m = audio 49170 RTP/AVP 0
a = rtpmap:0 PCMU/8000
m = video 51372 RTP/AVP 31
a = rtpmap:31 H261/90000

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 11, a first data channel for voice data and a second data channel for PID user data have been negotiated by the base applications 1008 in the first data network telephone 408 and the base applications 1100 in the second data network telephone 418. The base applications 1008 and 1100 transfer voice data between the AUDIO applications, such as applications including G.711 encoders, in each phone via the first data channel. The base applications 1008 in phone 408 are also configured to send the PID data received via link 409 from PID 410 to the base applications 1100 in phone 418 via the second data channel. The base applications 1100 in phone 418 may be configured to forward the PID data received via the second data channel to a second PID 420 via a second link 421. The PID application 1102 in PID 420 then outputs the PID data received from phone 418 to the user interface 1104 for output to the user of PID 420.

The PID data in FIG. 11 can take a variety of forms. For example, the PID data can be a text file containing information about the user of PID 410, such as an electronic business card. The PID data can also be drawing data generated by graphical applications in the PIDs 410 and 420 whereby a user drawing on a touchscreen of the user interface 1010 in PID 410 generates corresponding PID data that is transmitted via the second data channel to PID 420 for display on the user interface 1104 of PID 420. The media description for the media stream can be defined during connection setup to establish a connection appropriate to the type of data being transferred. These examples represent just a few of the applications for this aspect of the present invention and should not be viewed as limiting the present invention.

In one embodiment, RTP data packets for two or more types of data are exchanged between the first data network telephone 408 and the second data network telephone 418 according to one of three possible methods. In the first method, one RTP data channel (or RTP stream) on UDP carries data packets in which both data types are present in a single split packets. Each such split packet contains (1) a source port number and a destination port number in the UDP portion, and (2) a special payload sequentially including each of the data types in the RTP portion. The special payload type can be defined in the SDP described above. Other information is also contained in each packet as well. In the second method for transmitting two or more data types, a separate RTP over UDP data channel is created for each of the different data types, and the RTP header indicates which type of data is contained in each packet. For example, voice data coded as G.711 might be assigned a payload type code of 0, while PID data is assigned a payload type code of 190. In the third method for transmitting two or more data types, a single RTP/UDP data channel (RTP/UDP stream) is created that contains data packets of two or more different types. In this method, the data types are identified in a payload type field in the RTP header of each packet, enabling an underlying application to identify which data packets are voice data packets and which data packets are PID data packets, for example.

The data network telephones 408 and 418 may also be used to provide call handling services. For example, assume that a first user, having a first PID 410, registers with the first data network telephone 408. A second user, located at the second data network telephone 418, may place a call to the first user located at the first data network telephone 408, using techniques described above with reference to FIGS. 1–10. As part of the call set-up process, the first data network telephone 408 is notified of the call request from the second user located at the second data network telephone 418. According to an embodiment of the present invention, the base application 1008 in the first data network telephone 408 may access a call handling data base to determine an appropriate call handling procedure with respect to the call request from the second data network telephone 418. For example, the call handling database may contain address and/or appointment book entries having priorities assigned to one or more of the entries. If the appointment book entries show that the first user is currently at a meeting having a priority level of 5, then the incoming call request may be handled by comparing the priority of the incoming call to the priority of the meeting. The priority of the incoming call may be determined if the second user or the second data network telephone 418 is listed in the call handling data base, such as in an address book entry. If, for example, the second user is listed in the address book as having a priority level of 3, then the base application 1008 may compare this calling party (priority level=3) to the appointment (priority level=5) to determine that the call request is of a lower priority than the scheduled appointment, and may call the cause to be handled accordingly. A low priority call may receive a busy signal, may be forwarded to a voice mail system, or may be forwarded to an administrative assistant, for example. Similarly, if the first user is currently participating in an unrelated call with a third user having a priority level of 1, then the unrelated call may be interrupted by the call request from the second user located at the second data network telephone 418, due to the higher priority level (priority level=3) of the second user located at the second data network telephone 418. Other call handling functionality may also be implemented, and is intended to be encompassed within the scope of the present invention.

Figure 12:
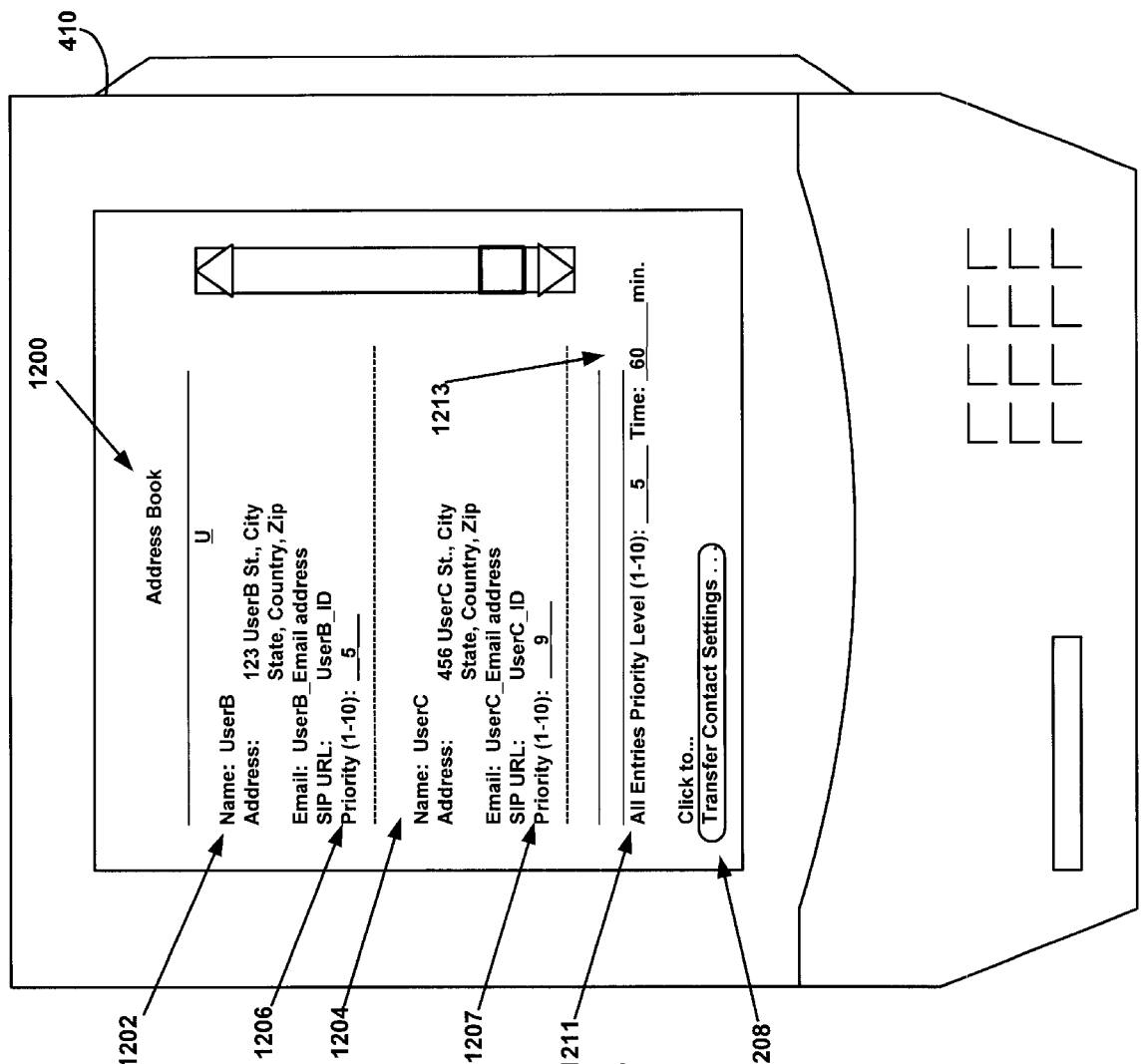
FIG. 12 is a pictorial diagram of an address book application on a PID according to an embodiment of the present invention.

FIG. 12 is a pictorial diagram showing an exemplary display screen of a PID 410 displaying entries from an address book application 1200 according to one embodiment of the present invention. Shown are a first contact entry 1202 and a second contact entry 1204 in the letter 'U' section of the address book 1200. The entries each contain contact information, such as name, address, email, SIP URL, and other information. In a preferred embodiment, the user of the PID 410 is given the option to prioritize entries in the address book. For example, the first contact entry 1202 has a priority flag 1206 and the second contact entry 1204 has a second priority flag 1207. The user may set the priority for each entry by entering a number from 1 to 10 at each flag 1206, 1207. The user may then click on a transfer button 1208 to send the settings to the data network telephone 408 on the interface. The contact entries may be transmitted individually, but are preferably transferred as a collective group.

In addition, a global priority level 1211 may be set for all entries. The user may enter a level at the global priority level to set the priority level for all users in the address book (and/or for all appointments in an appointment book). A priority time limit 1213 may be set for a selected level that indicates a do not disturb for a time period. As an alternative, the address book entries (and/or appointment book entries in an appointment book application) may be placed into different categories, such as business or personal, etc. Each category could then be assigned a priority level so that incoming calls for a particularly category will be handled according to the assigned priority level.

One of ordinary skill in the art will appreciate that any number or range of priority levels may be used, and that other ways to specify the priority levels may be used. For example, in another alternative embodiment, three priority levels may be used to indicate a normal level to always ring, a temporary do not disturb for a selected number of minutes, and a never disturb at all level.

FIG. 12 also illustrates an embodiment of the present invention in which a PID may instruct the data network telephone to perform the dialing operations from the address book 1200. The address book application 1200 may include a function that sends a telephone number and a dial command to the data network telephone over the PID interface (e.g. infrared, radio, serial, etc.). The dial command may be implicit in the sending of a user identifier (or telephone number) to the data network telephone. Alternatively, commands, including a dial command, may be defined for interaction between the data network telephone and the PID.

The PID may also be used to register the user with a particular data network telephone. The address book 1200 in the PID may then be used to perform dialing operations and call screening for that data network telephone as though it were the user's own telephone. The user may also use the data network telephone user interface (such as a keypad) to input the user identifier or device identifier (such as a phone number) of the party the user wishes to call. The telephony controller function 736 (in FIG. 7) may be included in the PID to register a data network telephone.

In order for the PID to perform these functions, the telephony enhanced PID address book 1200 and the telephony controller function 736 applications, or similar applications performing the functions must reside in the PID. In one embodiment, the data network telephone 408 (in FIG. 6) includes the PID update application 632. The user may use the PID update application 632 on his own telephone to load the applications on to his PID. The user may then take the PID and re-configure any data network telephone 408 to operate as though it were his own telephone.

Figure 13:
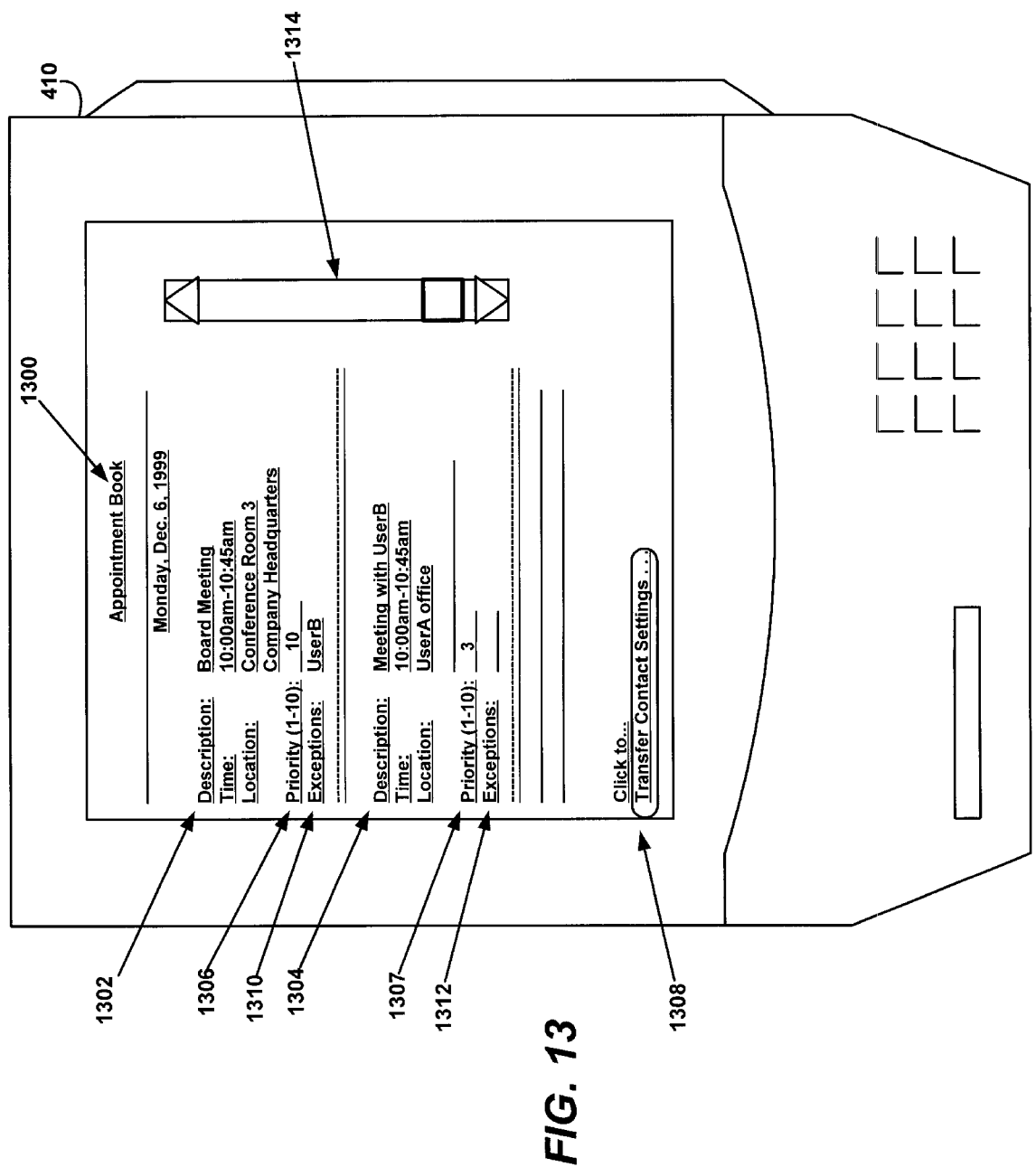
FIG. 13 is a pictorial diagram of an appointment book application on a PID according to an embodiment of the present invention.

FIG. 13 is a pictorial diagram showing an exemplary display screen of a PID 410 displaying entries from an appointment book application 1300 according to an embodiment of the present invention. Shown are a first appointment entry 1302 and a second appointment entry 1304 in the "Monday, Dec. 6, 1999" section of the appointment book 1300. The entries 1302 and 1304 each contain appointment information, such as the appointment description, the time and location of the appointment, and other information. In a preferred embodiment, the user of the PID 410 is given the option to prioritize entries in the appointment book. For example, the first appointment entry 1302 has a priority flag 1306 and the second appointment entry 1304 has a second priority flag 1307. The user of the PID 410 may set the priority for each entry by entering a number from 1 to 10 at each flag 1306 and 1307. The user may then click on the transfer button 1308 to send the settings to the data network telephone 408 via the interface. The appointment book entries may be transmitted individually, but are preferably transferred as a collective group, either for a particular day, week, or month, or for a more extended period of time, such as a period of years. Alternatively, all of the appointment book entries may be transmitted to the data network telephone 408, to assist in call handling operations. The appointment book application 1300 may also contain additional functionality, such as additional features to be used with call screening. As an example, exceptions "fields" 1310 and 1312 may be used to specify exceptions to the priority levels associated with each of the appointment book entries. (A similar exception scheme is, of course, also an option for use with the address book application 1200.) An option scroll bar 1314 may be included to assist navigating through the appointment book entries contained in the appointment book application 1300.

Figure 14:
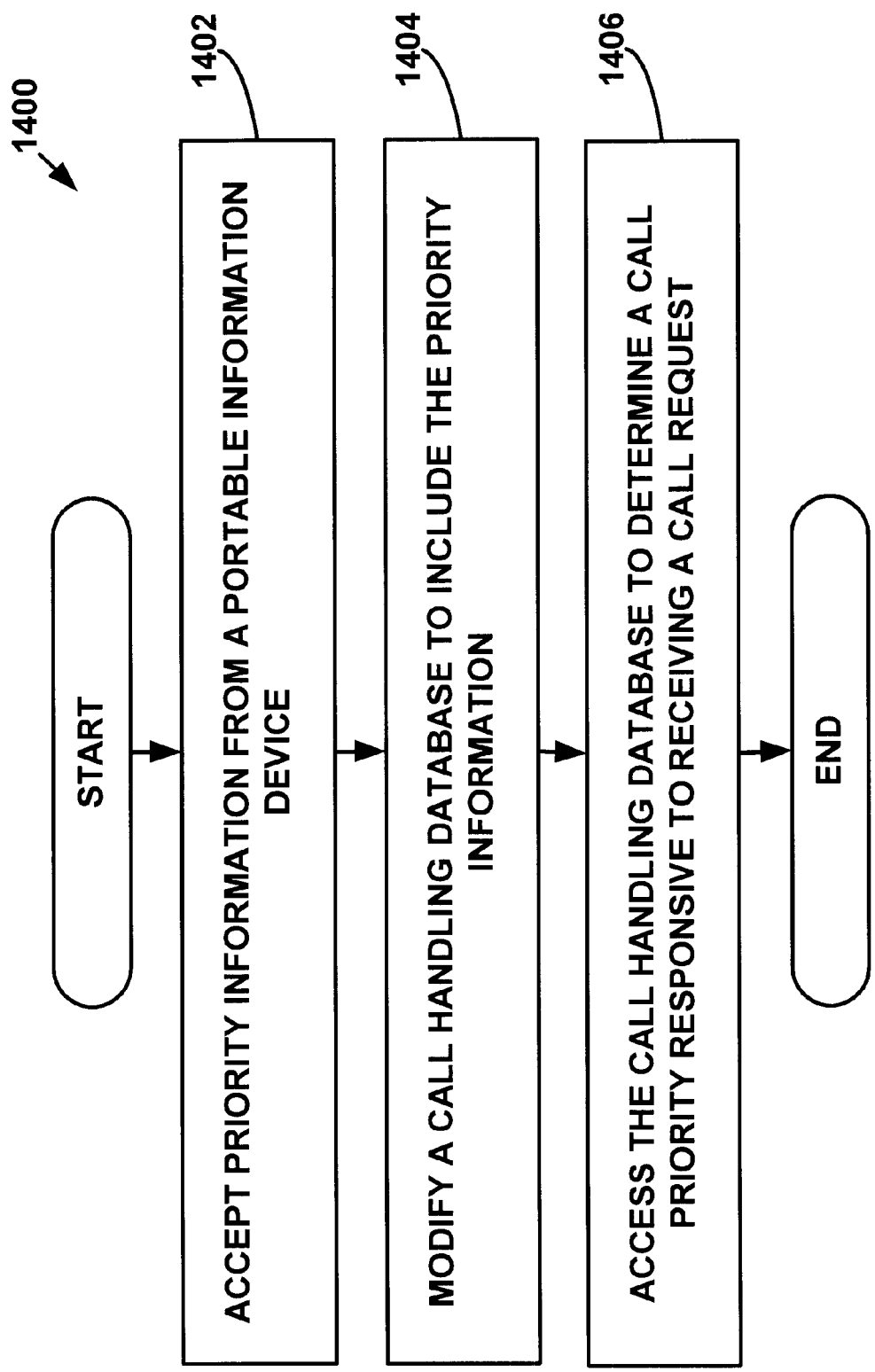
FIG. 14 is a flow diagram illustrating a method for providing call-handling services on a data network telephone system according to a preferred embodiment of the present invention.

FIG. 14 is a flow diagram illustrating a method 1400 for providing call handling services in a data network telephone system according to a preferred embodiment of the present invention. In step 1402, the data network telephone accepts priority information from the portable information device 410. A data network telephone modifies a call handling data base to include the priority information, as shown in step 1404. When the data network telephone 408 receives an incoming call request, the data network telephone 410 accesses the call handling data base to determine a call priority.

FIG. 15 is a flow diagram showing a method 1500 for providing call handling services on a data network telephone system, according to an alternative embodiment of the present invention. The data network telephone 408 accepts priority information transmitted from a portable information device 408, as shown in step 1502. The priority information includes address and/or address book entries and may include a specification of a priority level for one or more of the entries. The data network telephone 408 modifies a call handling data base to include the priority information, as shown in step 1504. A call handling application 625 in the data network telephone 408 preferably coordinates the acceptance of and storage of the priority attributes in the data network telephone 408. In step 1506, the data network telephone receives a call request, as shown in 1506. The call request includes a caller identifier, such as the caller's SIP address, or a name, phone number, address or other identifier. In step 1508 a determination is made as to whether the caller identifier corresponding to the received call request is listed in the call handling data base. If the caller identifier is not listed in the call handling data base, then a default call handling action may be performed, as shown in step 1510. For example, the data network telephone 408 may cause the call to be forwarded to voice mail. If the caller identifier is listed in the call handling data base, then a determination is made as to whether the caller priority level is greater than a threshold priority level, as shown in step 1512. The threshold priority level may be temporarily or permanently stored in the data network telephone 408, or it may be transmitted along with the priority information from the portable information device 410 to the data network telephone 408. For example, if the user of the portable information device 410 chooses a threshold priority level of 6, then the data network telephone 408 may be configured to only accept calls (i.e., ring the phone) if the call priority is higher than 6. The caller identifier and the caller priority level are preferably organized together within the call handling data base in the data network telephone 408. If the caller priority level is not greater than the threshold priority level, the a default call handling action is performed, as shown in step 1510. It is important to note that although only one default call handling action is shown in FIG. 1 (step 1510), the user may specify and the data network telephone 410 may support more than one default call handling action. For example, the call could receive a busy signal or it could be forwarded to an administrative assistant. If the caller priority level is greater than the threshold priority level, then the data network telephone performs a high-priority call routine, as shown in step 1514. For example, the data network telephone 408 may accept the call request and notify the callee, such as by ringing the phone.

One of ordinary skill in the art will appreciate that any number or range of priority levels may be used, and that other ways to specify the priority level may used. For example, in another alternative embodiment, three priority levels may be used to indicate a normal level to always ring, a temporary do not disturb for a selected number of minutes, and a never disturb level.

While the invention has been described in conjunction with presently preferred embodiments of the invention, persons of skill in the art will appreciate that variations may be made without departure from the scope and spirit of the invention. For example, the access networks shown in FIG. 4 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for providing call handling services in a data network telephone system comprising:
   a data network to provide data connectivity for a plurality of data communications channels using data transport protocols;
   a data network telephone connected to the data network, the data network telephone operable to communicate a voice signal as voice-over-data packets on a voice-over-data channel, the voice-over-data channel being one of the plurality of data communications channels on the data network, the data network telephones each operable to convert voice-over-data packets communicated on the voice-over-data channel to voice signals; and
   a portable information device comprising a data network telephone interface, the portable information device operable to transmit priority information to the data network telephone via the data network telephone interface;
   wherein the priority information is received at the data network telephone and wherein the data network telephone accesses the priority information in response to the data network telephone receiving a call request across the data network.

2. The system of claim 1, wherein a user identifier is associated with the portable information device, the user identifier including a unique sequence of alphanumeric elements.

3. The system of claim 2, wherein the data network telephone includes a device identifier, wherein the device identifier and the user identifier may be used to register the portable information device to the data network telephone.

4. The system of claim 3, wherein the device identifiers include Internet Protocol (IP) addresses.

5. The system of claim 2, wherein the user identifier includes a Session Initiation Protocol (SIP) address.

6. The system of claim 2, wherein the user identifier includes an E.164 telephone number.

7. The system of claim 1, further comprising:
   a network telephony user database connected to the data network to store a user identifier and a telephone identifier corresponding to the user identifier for each of a plurality of users, wherein:
   the user identifier includes a first sequence of alphanumeric elements that identifies a corresponding user;
   the telephone identifier includes a second sequence of alphanumeric elements that identifies a corresponding data network telephone; and
   a network telephony connection server operable to receive a request message from a second data network telephone to initiate the voice-over-data channel with the first data network telephone, and to send a response message in response to the request message.

8. The system of claim 7, wherein the response and request messages are communicated by the network telephony connection server in accordance with the Session Initiation Protocol (SIP).

9. The system of claim 7, wherein the response and request messages are communicated by the network telephony connection server in accordance with the H.323 Protocol.

10. The system of claim 7, wherein the response and request messages are communicated by the network telephony connection server in accordance with the MEGACO Protocol.

11. The system of claim 7, wherein the response and request messages are communicated by the network telephony connection server in accordance with the MGCP Protocol.

12. The system of claim 7, wherein:
   the request message includes a callee user identifier; and
   wherein the network telephony connection server determines the telephone identifier for callee user identifier and includes the telephone identifier in the response message.

13. The system of claim 7, wherein:
   the request message includes a callee user identifier; and
   wherein the network telephony connection server determines the telephone identifier for the callee identified in the call user identifier and sends the response message to the callee at the telephone identifier.

14. The system of claim 1, wherein the data network telephone further determines a caller priority level by accessing the priority information, and performs a call handling operation in response to the caller priority level being less than a threshold priority level.

15. The system of claim 1, wherein the priority information is stored in a call handling database.

16. The system of claim 1, wherein the priority information includes an address book entry having a priority level specification.

17. The system of claim 1, wherein the priority information includes an appointment book entry having a priority level specification.

18. The system of claim 1, wherein the portable information device is a smart card.

19. The system of claim 1, wherein the portable information device is a personal computer.

20. A voice communication device comprising:
   an interface to a data network,
   a plurality of telephony functions operable to communicate a voice signal as voice-over-data packets on a voice-over-data channel, the voice-over-data channel being one of a plurality of data communications channels supported by the data network, the telephony functions operable to convert voice-over-data packets communicated on the voice-over-data channel to voice signals;
   a PID interface link to a portable information device to transfer data between the portable information device and the voice communication device; and
   a call handling application operable to accept priority information from the portable information device, the call handling application accessing the priority information in response to the data network telephone receiving a call request across the data network.

21. The voice communication device of claim 20, wherein the data network provides data connectivity for the plurality of data communications channels using data transport protocols.

22. The voice communication device of claim 20, wherein the PID interface link is an infrared link.

23. The voice communication device of claim 20, wherein the PID interface link is a radio frequency link.

24. The voice communication device of claim 20, wherein the PID interface link is a Universal Serial Bus (USB) link.

25. The voice communication device of claim 20, wherein the call handling application:

identifies a caller identifier within the call request;

determines whether the caller identifier is listed in a call handling database maintained by the call handling application, and if so, determines whether a caller priority level is greater than a threshold priority level; and performs a high-priority call handling operation in response to determining that the caller priority level is greater than the threshold priority level.

26. A method for providing call handling services at a data network telephone in a data network telephone system, comprising the steps of:

accepting priority information transmitted by a portable information device;

modifying a call handling database to include the priority information;

accessing the call handling database responsive to the data network telephone receiving a call request.

27. The method of claim 26, wherein the portable information device transmits the priority information to the data network telephone via a wireless link.

28. The method of claim 26, wherein the priority information includes an address book entry having a priority level specification.

29. The method of claim 26, wherein the priority information includes an appointment book entry having a priority level specification.

30. The method of claim 26, further comprising the step of performing a call handling operation responsive to a caller priority associated with the calling party being less than a threshold priority, the caller priority and the threshold priority determined from the priority information.

31. A computer readable medium having stored therein instructions for causing a processing unit to execute the method of claim 26.

32. A method for providing call handling services at a data network telephone in a data network telephone system, comprising the steps of:

accepting priority information from a portable information device;

modifying a call handling database to include the priority information;

receiving a call request including a caller identifier;

determining whether the caller identifier is listed in the call handling database, and if so, determining whether a caller priority level is greater than a threshold priority level; and performing a high-priority call handling operation in response to determining that the caller priority level is greater than the threshold priority level.

33. The method of claim 32, wherein the priority information includes an address book entry having a priority level specification.

34. The method of claim 32, wherein the priority information includes an appointment book entry having a priority level specification.

35. The method of claim 32, wherein the priority information is transmitted from the portable information device across a link to the data network telephone during a registration session, the registration session registering a user associated with the portable information device to the data network telephone.

36. The method of claim 32, wherein the link is a wireless link.

37. The method of claim 32, wherein the high-priority call handling operation includes accepting the call request and notifying a user associated with the portable information device.

38. The method of claim 32, wherein the high-priority call handling operation includes accepting the call request and forwarding a call corresponding to the call request to a second data network telephone.

39. A computer readable medium having stored therein instructions for causing a processing unit to execute the method of claim 32.

40. A system for providing call handling services comprising:

a data network to provide data connectivity for a plurality of data communications channels using data transport protocols;

a data network telephone connected to the data network, the data network telephone operable to communicate a voice signal as voice-over-data packets on a voice-over-data channel, the voice-over-data channel being one of the plurality of data communications channels on the data network, the data network telephones each operable to convert voice-over-data packets communicated on the voice-over-data channel to voice signals; and a personal computer comprising a data network telephone interface, the personal computer operable to transmit priority information to the data network telephone via the data network telephone interface;

wherein the priority information is received at the data network telephone and wherein the data network telephone accesses the priority information in response to the data network telephone receiving a call request across the data network.

41. The method of claim 40, wherein the data network telephone is included within the personal computer.

* * * * *